US012762326B2

(12) United States Patent
Garimella et al.

(10) Patent No.: US 12,762,326 B2
(45) Date of Patent: Oct. 13, 2026

(54) GENERATING AND UTILIZING MODELS FOR LONG-RANGE EVENT RELATION EXTRACTION

(71) Applicant: Adobe Inc., San Jose, CA (US)

(72) Inventors: Aparna Garimella, Hyderabad (IN); Anandhavelu Natarajan, Bangalore (IN); Abhilasha Sancheti, College Park, MD (US); Sarthak Chauhan, DehraDun (IN); Prateek Agarwal, Jaipur (IN); Harshit Varma, Thane (IN)

(73) Assignee: Adobe Inc., San Jose, CA (US)

( * ) Notice: Subject to any disclaimer, the term of this patent is extended or adjusted under 35 U.S.C. 154(b) by 425 days.

(21) Appl. No.: 18/316,674

(22) Filed: May 12, 2023

(65) Prior Publication Data

US 2024/0378370 A1 Nov. 14, 2024

(51) Int. Cl.
*G06F 40/166* (2020.01)
*G06F 40/20* (2020.01)
(Continued)

(52) U.S. Cl.
CPC ............ *G06F 40/166* (2020.01); *G06F 40/20* (2020.01); *G06F 40/40* (2020.01); *G06N 3/0455* (2023.01); *G06N 3/0475* (2023.01); *G06N 3/092* (2023.01)

(58) Field of Classification Search
CPC ........ G06F 40/166; G06F 40/20; G06F 40/40; G06F 40/30; G06F 40/56; G06N 3/0455;
(Continued)

(56) References Cited

U.S. PATENT DOCUMENTS

2020/0012953 A1* 1/2020 Sun ........................ G06N 3/006
2020/0175099 A1* 6/2020 Ono ...................... G06F 3/0482
(Continued)

OTHER PUBLICATIONS

Huang et al. (INSET: Sentence Infilling with INter-SEntential Transformer, published Jun. 4, 2020, pp. 1-15) (Year: 2020).*
(Continued)

*Primary Examiner* — Stephen S Hong
*Assistant Examiner* — Ahamed I Nazar
(74) *Attorney, Agent, or Firm* — Keller Preece PLLC

(57) ABSTRACT

The present disclosure relates to systems, methods, and non-transitory computer-readable media that generates a long-range event relation dataset by augmenting a digital document with a set of synthetic sentences. For example, the disclosed systems access a digital document from a short-range event relation dataset that includes an event pair. In some embodiments, the disclosed systems generate a set of synthetic sentences utilizing a generative language model for inserting within the digital document between the event pair to satisfy a long-range event relation threshold. In these or other embodiments, the disclosed systems generate a long-range event relation dataset by augmenting the digital document within the short-range event relation dataset to include the set of synthetic sentences. In certain cases, the disclosed systems generate an event relation extraction model to determine long-range event relations by learning model parameters for the event relation extraction model from the long-range event relation dataset.

20 Claims, 14 Drawing Sheets

(51) Int. Cl.
*G06F 40/40* (2020.01)
*G06N 3/0455* (2023.01)
*G06N 3/0475* (2023.01)
*G06N 3/092* (2023.01)

(58) Field of Classification Search
CPC ...... G06N 3/0475; G06N 3/092; G06N 3/044; G06N 3/045; G06N 3/08
USPC .......................................................... 715/256
See application file for complete search history.

(56) References Cited

U.S. PATENT DOCUMENTS

2021/0099317 A1* 4/2021 Hilleli ................... G06F 40/216
2021/0174193 A1* 6/2021 Pouran Ben Veyseh .................... G06N 7/01
2022/0050967 A1* 2/2022 Veyseh ................ G06F 40/216

OTHER PUBLICATIONS

Zhu et al. (Text Infilling, published Jan. 18, 2019, pp. 1-10) (Year: 2019).*
Yasui et al. (Using Semantic Similarity as Reward for Reinforcement Learning in Sentence Generation, published Aug. 2, 2019, pp. 1-8) (Year: 2019).*
Kang et al. (Linguistic Versus Latent Relations for Modeling Coherent Flow in Paragraphs, published Aug. 30, 2019, pp. 1-8) (Year: 2019).*
Paul et al. (COINS: Dynamically Generating COntextualized Inference Rules for Narrative Story Completion, published Aug. 2021 , pp. 1-14) (Year: 2021).*
Ji et al. DISCODVT: Generating Long Text with Discourse-Aware Discrete Variational Transformer, published Nov. 2021, pp. 1-17. (Year: 2021).*
Guan et al. (Long Text Generation by Modeling Sentence-Level and Discourse-Level Coherence, published Aug. 2021, pp. 1-15. (Year: 2021).*
“BBN-E / LearnIt” webpage: <https://github.com/BBN-E/LearnIt>, Sep. 8, 2021, 5 pages, retrieved on Jul. 20, 2023.
Bethard, S., Martin, J. H., & Klingenstein, S. (Sep. 2007). Timelines from text: Identification of syntactic temporal relations. In International Conference on Semantic Computing (ICSC 2007) (pp. 11-18). IEEE.
Brown, T., Mann, B., Ryder, N., Subbiah, M., Kaplan, J. D., Dhariwal, P., . . . & Amodei, D. (2020). Language models are few-shot learners. Advances in neural information processing systems, 33, 1877-1901.
Cassidy, T., McDowell, B:, Chambers, N., & Bethard, S. (2014). An annotation framework for dense event ordering. Carnegie-Mellon Univ Pittsburgh PA.
Chambers, N., Cassidy, T., McDowell, B., & Bethard, S. (2014). Dense event ordering with a multi-pass architecture. Transactions of the Association for Computational Linguistics, 2, 273-284.
Chambers, N., Wang, S., & Jurafsky, D. (Jun. 2007). Classifying temporal relations between events. In Proceedings of the 45th annual meeting of the association for computational linguistics companion volume proceedings of the demo and poster sessions (pp. 173-176).
Della, “Have total confidence in your contract review process,” webpage: <https://dellalegal.com/ >, 11 pages, retrieved Jul. 20, 2023.
Devlin, J., Chang, M. W., Lee, K., & Toutanova, K. (2018). Bert: Pre-training of deep bidirectional transformers for language understanding. arXiv preprint arXiv:1810.04805.
Evisort, “Contract intelligence: the next generation of contract lifecycle management,” webpage: <https://www.evisort.com/platform/platform-overview>, 6 pages, retrieved Jul. 20, 2023.
Fan, A., Lewis, M., & Dauphin, Y. (2018). Hierarchical neural story generation. arXiv preprint arXiv:1805.04833.
Fu-Hao Yu and Kuan-Yu Chen. 2020. A preliminary study on leveraging meta learning technique for code-switching speech recognition. In Proceedings of the 32nd Conference on Computational Linguistics and Speech Processing (ROCLING 2020), pp. 136-147, Taipei, Taiwan.
Han, R., Hsu, I., Yang, M., Galstyan, A., Weischedel, R., & Peng, N. (2019). Deep structured neural network for event temporal relation extraction. arXiv preprint arXiv:1909.1009.
Han, R., Ning, Q., & Peng, N. (2019). Joint event and temporal relation extraction with shared representations and structured prediction. arXiv preprint arXiv:1909.05360.
Holtzman, A., Buys, J., Du, L., Forbes, and M., Choi, Y. The Curious Case of Neural Text Degeneration. ICLR 2020.
Huang, Y., Zhang, Y., Elachqar, O., & Cheng, Y. (2019). INSET: Sentence infilling with INter-SEntential transformer. arXiv preprint arXiv:1911.03892.
IBM, “IBM Watson Natural Language Understanding,” webpage <https://www.ibm.com/cloud/watson-natural-language-understanding>, 11 pages, retrieved Jul. 20, 2023.
Intelagree, “Your Contracts. Simplified. Automated. Evolved. Optimized.” webpage: <https://www.intelagree.com/>, 13 pages, retrieved Jul. 20, 2023.
Jaggaer, “Autonomous Commerce,” webpage: <https://www.jaggaer.com>, 20 pages, retreived Jul. 20, 2023.
Lei Gao, Prafulla Kumar Choubey, and Ruihong Huang. 2019. Modeling document-level causal structures for event causal relation identification. In Proceedings of the 2019 Conference of the North American Chapter of the Association for Computational Linguistics: Human Language Technologies, vol. 1 (Long and Short Papers), pp. 1808-1817, Minneapolis, Minnesota.
Liu, Y., Ott, M., Goyal, N., Du, J., Joshi, M., Chen, D., . . . & Stoyanov, V. (2019). Roberta: A robustly optimized bert pretraining approach. arXiv preprint arXiv:1907.11692.
Man, H., Ngo, N. T., Van, L. N., & Nguyen, T. H. (Jun. 2022). Selecting optimal context sentences for event-event relation extraction. In Proceedings of the AAAI Conference on Artificial Intelligence (vol. 36, No. 10, pp. 11058-11066).
Mani, I., Verhagen, M., Wellner, B., Lee, C., & Pustejovsky, J. (Jul. 2006). Machine learning of temporal relations. In Proceedings of the 21st International Conference on Computational Linguistics and 44th Annual Meeting of the Association for Computational Linguistics (pp. 753-760).
Mathur, P., Jain, R., Dernoncourt, F., Morariu, V., Tran, Q. H., & Manocha, D. (Aug. 2021). Timers: document-level temporal relation extraction. In Proceedings of the 59th Annual Meeting of the Association for Computational Linguistics and the 11th International Joint Conference on Natural Language Processing (vol. 2: Short Papers) (pp. 524-533).
Mirza, P., & Tonelli, S. (2016). Catena: Causal and temporal relation extraction from natural language texts. In The 26th international conference on computational linguistics (pp. 64-75). ACL.
Naik, A., Breitfeller, L., & Rose, C. (Sep. 2019). TDDiscourse: A dataset for discourse-level temporal ordering of events. In Proceedings of the 20th Annual SIGdial Meeting on Discourse and Dialogue (pp. 239-249).
Ning, Q., Feng, Z., & Roth, D. (Sep. 2017). A Structured Learning Approach to Temporal Relation Extraction. In Proceedings of the 2017 Conference on Empirical Methods in Natural Language Processing (pp. 1027-1037).
Ning, Q., Subramanian, S., & Roth, D. (2019). An improved neural baseline for temporal relation extraction. arXiv preprint arXiv:1909.00429.
Ning, Q., Wu, H., & Roth, D. (2018). A multi-axis annotation scheme for event temporal relations. arXiv preprint arXiv:1804.07828.
Pustejovsky, J., Castano, J. M., Ingria, R., Sauri, R., Gaizauskas, R. J., Setzer, A., . . . & Radev, D. R. (2003). TimeML: Robust specification of event and temporal expressions in text. New directions in question answering, 3, 28-34.
Pustejovsky, J., Hanks, P., Sauri, R., See, A., Gaizauskas, R., Setzer, A., & Lazo, M. (2003, March). The timebank corpus: In Corpus linguistics (vol. 2003, p. 40).

(56) References Cited

OTHER PUBLICATIONS

Roth, D., & Yih, W. T. (2004). A linear programming formulation for global inference in natural language tasks. Illinois Univ at Urbana-Champaign Dept of Computer Science.
Speer, R.; Chin, J.; and Havasi, C. 2017. ConceptNet 5.5: An Open Multilingual Graph of General Knowledge. In AAAI.
Verhagen, M., & Pustejovsky, J. (Aug. 2008). Temporal processing with the TARSQI toolkit. In COLING 2008: Companion Volume: Demonstrations (pp. 189-192).
Wang, H., Chen, M., Zhang, H., & Roth, D. (2020). Joint constrained learning for event-event relation extraction. arXiv preprint arXiv:2010.06727.
Williams, R. J. 1992. Simple Statistical Gradient-Following Algorithms for Connectionist Reinforcement Learning. In Kluwer Academic.
Yao, H. R., Breitfeller, L., Naik, A., Zhou, C., & Rose, C. (2022). Multi-Scale Contrastive Co-Training for Event Temporal Relation Extraction. NAACL.
Zhang, S., Ning, Q., & Huang, L. (Jul. 2022). Extracting Temporal Event Relation with Syntax-guided Graph Transformer. In Findings of the Association for Computational Linguistics: NAACL 2022 (pp. 379-390).

* cited by examiner

| Bin 700 | # Test samples 702 | F1 score 704 |
|---|---|---|
| [0, 5) | 589 | 48.2 |
| [5, 10) | 602 | 47.7 |
| [10, 15) | 239 | 52.3 |
| [15, 22) | 70 | 42.9 |

*Fig. 7*

| Dataset type | Average number of sentences between two related events | Median of number of sentences between two related events | Average sentence perplexity from BERT |
|---|---|---|---|
| Original | 13.39 | 9 | 29.88 |
| Augmented | 31.95 | 29 | 29.39 |

800

802

*Fig. 8*

GENERATING AND UTILIZING MODELS FOR LONG-RANGE EVENT RELATION EXTRACTION

BACKGROUND

Recent years have seen significant advancement in software platforms for automated event relation extraction from digital documents. For example, many document analysis systems utilize computer models to determine relationships between various occurrences or events described within a digital document. In particular, many document analysis systems process digital documents to identify relationships between various terms that indicate or define events within a digital document. However, despite these advancements, existing document analysis systems continue to suffer from a variety of problems with regard to computational accuracy and operational flexibility.

SUMMARY

One or more embodiments described herein provide benefits and/or solve one or more of the problems in the art with systems, methods, and non-transitory computer-readable media that determine long-range event relations in digital documents using a synthetically augmented event relation dataset. For example, the disclosed systems access a digital document from a short-range event relation dataset that includes an event pair. In some embodiments, the disclosed systems generate a set of synthetic sentences for inserting within the digital document to separate the event pair by a number of sentences to satisfy a long-range event relation threshold. In certain embodiments, the disclosed systems generate a long-range event relation dataset by augmenting the digital document to include the set of synthetic sentences. Moreover, in some cases, the disclosed systems generate an event relation extraction model which determines long-range event relations within digital documents based on training the event relation extraction model on the generated long-range event relation dataset. Accordingly, during implementation of the event relation extraction model trained on a synthetically augmented long-range event relation dataset, the disclosed system generates an event relation graph that indicates long-range event relations between a long-range event pair.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 7 illustrates example results of a number of sentences separating event pairs in prior systems in accordance with one or more embodiments;

FIG. 8 illustrates example results of the long-range event relation system comparing a number of sentences separating event pairs in an augmented dataset versus prior systems in accordance with one or more embodiments;

DETAILED DESCRIPTION

Figure 1:
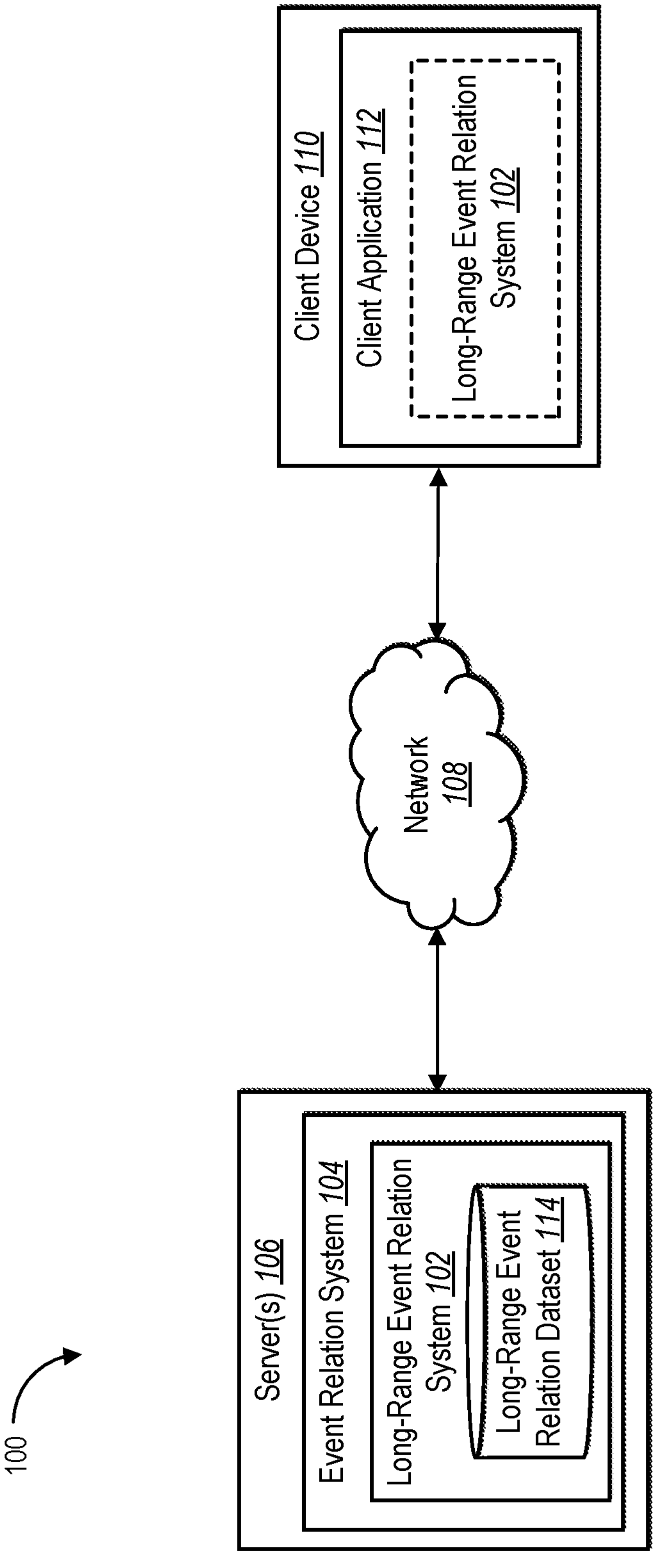
FIG. 1 illustrates an example environment in which a long-range event relation system operates in accordance with one or more embodiments.

One or more embodiments described herein include a long-range event relation system that trains and utilizes an event relation extraction model to determine long-range event relations based on augmenting one or more digital documents from an event relation dataset. For example, as a basis for training the event relation extraction model, the long-range event relation system adapts a short-range event relation dataset for extracting long-range event relations by augmenting a digital document from the short-range event relation dataset to include synthesized sentences to further separate short-range event pairs. In particular, in some embodiments, the long-range event relation system synthesizes additional sentences to insert within a digital document to separate an event pair using a generative language model. In these or other embodiments, the long-range event relation system learns parameters for an event relation extraction model to capture or encode long-range event relations from a dataset that includes such synthetically augmented digital documents.

As just mentioned, in one or more embodiments, the long-range event relation system generates a synthetically augmented long-range event relation dataset as a basis for training an event relation extraction model. For example, the long-range event relation system augments an available short-range event relation dataset by generating synthetic sentences to insert between pairs of related events (e.g., temporally related, or causally related) within digital documents of the short-range event relation dataset. In particular, in some embodiments, the long-range event relation system generates synthetic sentences using a generative language model that encourages coherency within the context of insertion locations within digital documents.

As mentioned, in certain embodiments, the long-range event relation system generates a set of synthetic sentences to augment a digital document to generate a long-range event relation dataset. For example, the long-range event relation system identifies pairs of related events within a digital document by identifying host sentences that include or describe respective events. Additionally, in some cases, by inserting the synthetic sentences between two host sentences that define or host an event pair, the long-range event relation system increases a range (e.g., a number of sentences or a number of characters) between the events than was present in the original text of the digital document.

In one or more embodiments, the long-range event relation system generates and inserts a number of synthetic sentences to separate an event pair by a distance or a range that satisfies a long-range event relation threshold. In particular, the long-range event relation system generates or induces long-range between event pairs by determining an already existing number of sentences between (short-range) event pairs and adding synthetic sentences between them. For instance, the long-range event relation system separates event pairs to have a total number of sentences between them of at least a threshold number of sentences (e.g., eleven sentences or fifteen sentences).

In one or more embodiments, the long-range event relation system generates synthetic sentences based on contextual data (e.g., additional sentences that are adjacent, and provide context, to host sentences that include events). For example, the long-range event relation system determines and utilizes pre-context sentences occurring before a first host sentence (including a first event of an event pair) and post-context sentence occurring after a second host sentence (including a second event of the event pair). By utilizing the pre-context sentences and post-context sentences to inform a generative language model, the long-range event relation system generates contextually coherent synthetic sentences to insert between host sentences of a digital document.

In some embodiments, the long-range event relation system generates or trains an event relation extraction model by learning model parameters from a long-range event relation dataset generated by inserting synthetic sentences. In some cases, the long-range event relation system further applies or implements a trained event relation extraction model to determine long-range event relations from a digital document. For example, the long-range event relation system generates an event relation graph that defines or indicates relationships between event pairs, even for event pairs separated by large distances (e.g., a number of sentences that satisfies a long-range event relation threshold).

As mentioned above, many conventional document understanding systems suffer from a number of issues in relation to inaccuracy, and operational inflexibility. For example, some existing document analysis systems are inaccurate. For example, as mentioned, conventional document analysis systems often generate or determine inaccurate event relations for long-range event pairs in digital documents. Indeed, due at least in part to their limited training data, which generally consists of short-range event relation data (e.g., data pertaining to event pairs within a threshold distance of one another), many existing document analysis systems struggle to generate, or are incapable of generating, event relations for event pairs separated by distances greater than those within available training samples. Consequently, many existing systems produce large numbers of erroneous (or otherwise fail to produce) event relations for digital documents that describe events in various widespread locations.

Relatedly, certain conventional document analysis systems suffer from operational inflexibility. Indeed, for reasons similar to those described in relation the inaccuracies of some prior systems, many prior systems are also rigidly limited to determining event relations for only short-range event pairs. In particular, because some conventional document analysis systems are trained only on short-range event pairs, these systems cannot adapt to determine event relations for digital documents that include event pairs separated by greater distances (e.g., more a short-range event threshold).

As suggested, one or more embodiments of the long-range event relation system provide several advantages over conventional document analysis systems. For example, in one or more embodiments, the long-range event relation system improves accuracy over prior systems. For example, as mentioned, the long-range event relation system synthesizes long-range event relation data from short-range event relation datasets by augmenting digital documents within the short-range event relation dataset with synthetic sentences. Additionally, the long-range event relation system generates or trains an event relation extraction model by learning model parameters for the event relation extraction model from the synthetically augmented long-range event relation dataset. Accordingly, unlike prior systems trained only on short-range event relation data, the long-range event relation system accurately determines long-range event relations from digital documents based on training an event relation extraction model on long-range event relation data.

In addition to accuracy improvements, in one or more embodiments, the long-range event relation system improves operational flexibility over prior systems. For reasons similar to those described in relation to the accuracy improvements, the long-range event relation system can flexibly adapt event relation extraction for short-range event pairs as well as long-range event pairs. Thus, in contrast to prior systems that are rigidly fixed to short-range event relation extraction, the long-range event relation system has a diverse capability to determine long-range event relations and short-term event relations.

Additional detail regarding the long-range event relation system will now be provided with reference to the figures. For example, FIG. 1 illustrates a schematic diagram of an exemplary system environment 100 in which the long-range event relation system 102 operates. As illustrated in FIG. 1, the system environment 100 includes a server(s) 106, an event relation system 104, a long-range event relation dataset 114, a network 108, a client device 110, and a client application 112.

Although the system environment 100 of FIG. 1 is depicted as having a particular number of components, the system environment 100 is capable of having any number of additional or alternative components (e.g., any number of servers, client devices, or other components in communication with the long-range event relation system 102 via the network 108). Similarly, although FIG. 1 illustrates a particular arrangement of the server(s) 106, the network 108, and the client device 110, various additional arrangements are possible.

The server(s) 106, the network 108, and the client device 110 are communicatively coupled with each other either directly or indirectly (e.g., through the network 108 discussed in greater detail below in relation to FIG. 13). Moreover, the server(s) 106 and the client device 110 include one or more of a variety of computing devices (including one or more computing devices as discussed in greater detail in relation to FIG. 13).

As mentioned above, the system environment 100 includes the server(s) 106. In one or more embodiments, the server(s) 106 access digital documents from short-range event relation datasets to further generate a set of synthetic sentences between related events and a long-range event relation dataset. In one or more embodiments, the server(s) 106 comprises a data server. In some implementations, the server(s) 106 comprises a communication server or a web-hosting server.

In one or more embodiments, the client device 110 includes a computing device that is able to generate and/or provide, for display, an event relation graph indicating long-range event relations on the client application 112. For example, the client device 110 can include a smartphone, tablet, a desktop computer, laptop computer, a head-mounted-display device, or other electronic devices. The client device 110 includes one or more applications (e.g., a document understanding application) for processing digital documents in accordance with the event relation system 104. For example, in one or more embodiments, the client application 112 works in tandem with the long-range event relation system 102 to process digital documents utilizing an event relation extraction model that includes parameters learned from a synthetically augmented long-range event relation dataset. In particular, the client application 112 includes a software application installed on the client device 110. Additionally, or alternatively, the client application 112 of the client device 110 includes a software application hosted on the server(s) 106 which may be accessed by the client device 110 through another application, such as a web browser.

To provide an example implementation, in some embodiments, the long-range event relation system 102 on the server(s) 106 supports the long-range event relation system 102 on the client device 110. For instance, in some cases, the event relation system 104 on the server(s) 106 gathers data for the long-range event relation system 102. In response, the long-range event relation system 102, via the server(s) 106, provides the information to the client device 110. In other words, the client device 110 obtains (e.g., downloads) the long-range event relation system 102 from the server(s) 106. Once downloaded, the long-range event relation system 102 on the client device 110 trains (and utilizes) an event relation extraction model with a synthetically augmented long-range event relation dataset 114.

In alternative implementations, the long-range event relation system 102 includes a web hosting application that allows the client device 110 to interact with content and services hosted on the server(s) 106. To illustrate, in one or more implementations, the client device 110 accesses a software application supported by the server(s) 106. In response, the long-range event relation system 102 on the server(s) 106, trains an event relation extraction model and generates event relation graphs defining long-range event relations for a digital document. The server(s) 106 then provides the event relation graph to the client device 110 for display.

To illustrate, in some cases, the long-range event relation system 102 on the client device 110 receives a digital document that includes events separated by long distances. The client device 110 transmits the digital document to the server(s) 106. In response, the long-range event relation system 102 on the server(s) 106 utilizes an event relation extraction model trained utilizing synthetically augmented long-range event relation datasets to generate an event relation graph. In some cases, the client device 110 uses a trained event relation extraction model to generate an event relation graph from the digital document (e.g., via the client application 112).

Indeed, in some embodiments, the long-range event relation system 102 is implemented in whole, or in part, by the individual elements of the system environment 100. For instance, although FIG. 1 illustrates the long-range event relation system 102 implemented or hosted on the server(s) 106, different components of the long-range event relation system 102 are able to be implemented by a variety of devices within the system environment 100. For example, one or more (or all) components of the long-range event relation system 102 are implemented by a different computing device (e.g., the client device 110) or a separate server from the server(s) 106. Indeed, as shown in FIG. 1, the client device 110 includes the long-range event relation system 102. Example components of the long-range event relation system 102 will be described below with regard to FIG. 10.

Figure 2:
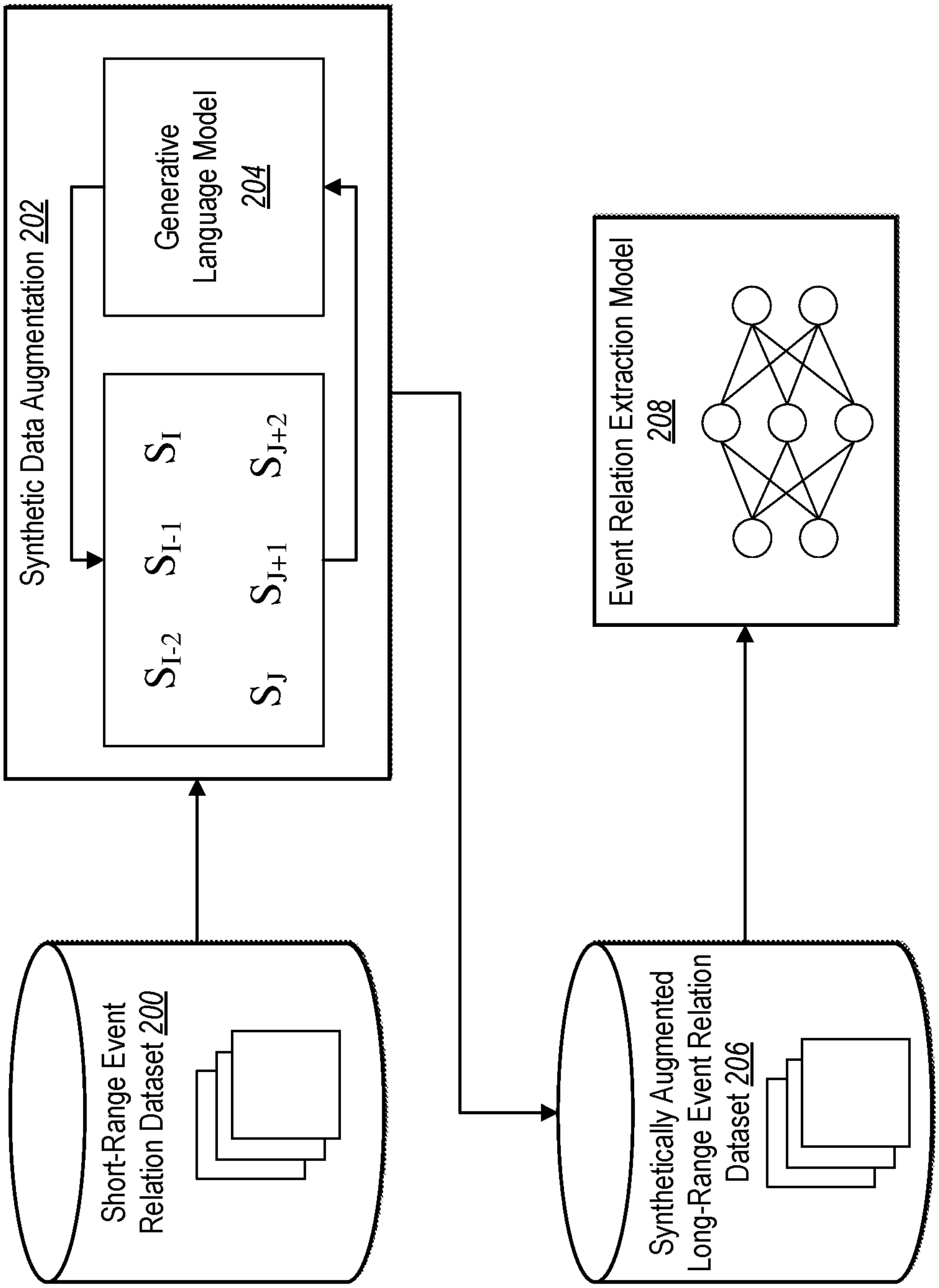
FIG. 2 illustrates an overview of the long-range event relation system training an event relation extraction model with a synthetically augmented long-range event relation dataset in accordance with one or more embodiments.

As mentioned above, in certain embodiments, the long-range event relation system generates or trains an event relation extraction model based on synthetically augmented long-range event relation data. FIG. 2 illustrates an overview of the long-range event relation system 102 training an event relation extraction model with a synthetically augmented long-range event relation dataset in accordance with one or more embodiments.

For example, FIG. 2 shows the long-range event relation system 102 processing a short-range event relation dataset 200 to generate a synthetically augmented long-range event relation dataset 206. Specifically, the long-range event relation system 102 analyzes the short-range event relation dataset 200 which includes digital documents describing events (e.g., topics or subjects) in respective host sentences within a threshold distance (e.g., number of sentences) of one another. For instance, the short-range event relation dataset 200 contains digital documents with event pairs less separated by less than a threshold distance (e.g., fewer than a threshold number of sentences). To illustrate by way of an example, the short-range event relation dataset 200 includes a digital document with a first host sentence that describes a first event (e.g., the due date of a payment) and a second host sentence that describes a second event (e.g., a failure to remit payment, where the first event (or first host sentence) and the second event (or second host sentence) are five sentences apart.

As further shown, the long-range event relation system 102 performs synthetic data augmentation 202 on the short-range event relation dataset 200. For example, the synthetic data augmentation 202 includes generating a set of synthetic sentences to insert between short-range event pairs of the short-range event relation dataset 200. In particular, the long-range event relation system 102 utilizes a generative language model 204 to perform the synthetic data augmentation 202. For instance, the generative language model 204 includes one or more artificial intelligence models capable of processing and generating natural language text based on contextual data. In particular, the generative language model 204 is trained on large amounts of data to learn patterns and rules of language. As such, the generative language model 204, post-training, is capable of generating text similar in style and content to input data, such as context sentences before and after host sentences.

As mentioned, in one or more embodiments, the long-range event relation system 102 utilizes the generative language model 204 to generate a set of synthetic sentences and augment the short-range event relation dataset 200 with the synthetic sentences. In particular, via augmentation with the synthetic sentences, the long-range event relation system 102 generates a synthetically augmented long-range event relation dataset 206 that includes digital documents with host sentences (or event pairs) separated by distances that satisfy a long-range event relation threshold.

As just mentioned, the synthetically augmented long-range event relation dataset 206 includes events separated by a number of sentences that satisfies the long-range event relation threshold. For example, the synthetically augmented long-range event relation dataset 206 includes multiple digital documents with events described in host sentences that are separated by distances that satisfy the long-range event relation threshold. In particular, in one or more embodiments, the synthetically augmented long-range event relation dataset 206 includes a first event and a second event separated by a threshold number of sentences (e.g., eleven, fifteen, or eighteen sentences). Accordingly, the synthetically augmented long-range event relation dataset 206 contains multiple documents with multiple event pairs, each separated by a number of sentences that satisfies the long-range event relation threshold.

As further shown, the long-range event relation system 102 generates an event relation extraction model 208. For example, the long-range event relation system 102 generates the event relation extraction model 208 by training the event relation extraction model 208 on the synthetically augmented long-range event relation dataset 206. Indeed, the long-range event relation system 102 trains the event relation extraction model 208 using a reinforcement learning process, as described in further detail below. In some embodiments, the event relation extraction model 208 includes a natural language processing technique to identify and extract relationships (based on learned parameters) between events that occur within the text of the digital document. For instance, the long-range event relation system 102 utilizes the event relation extraction model 208 to extract temporal and/or causal relationships between events. Furthermore, the long-range event relation system 102 includes a machine learning model such as a neural network.

In one or more embodiments, the long-range event relation system 102 trains and utilizes the event relation extraction model 208 to determine long-range event relations within a digital document. In particular, long-range event relations include a pair of related events separated by a distance (e.g., a number of sentences or a number of characters) that satisfies a long-range event relation threshold. As an example, the long-range event relation system 102 determines a long-range event relation between a first event that appears on a first page of the digital document and a second event that appears on the hundredth page of the digital document. Moreover, the long-range event relation system 102 utilizes the event relation extraction model 208 to generate a visual representation of extracted long-range event relations.

Figure 3A:
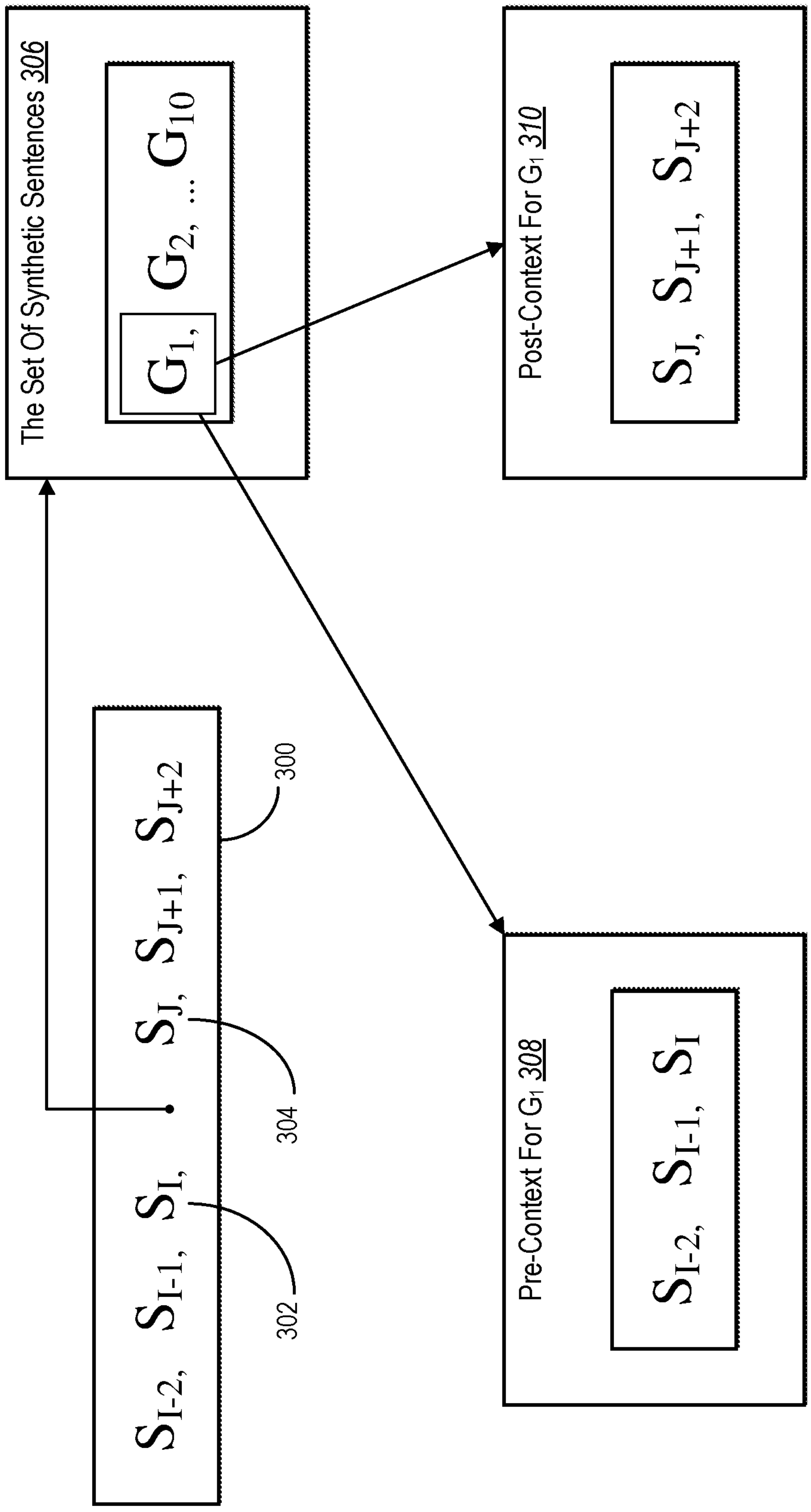
FIGS. 3A-3B illustrate diagrams of the long-range event relation system identifying pre-context and post-context sentences in accordance with one or more embodiments.
Figure 3B:
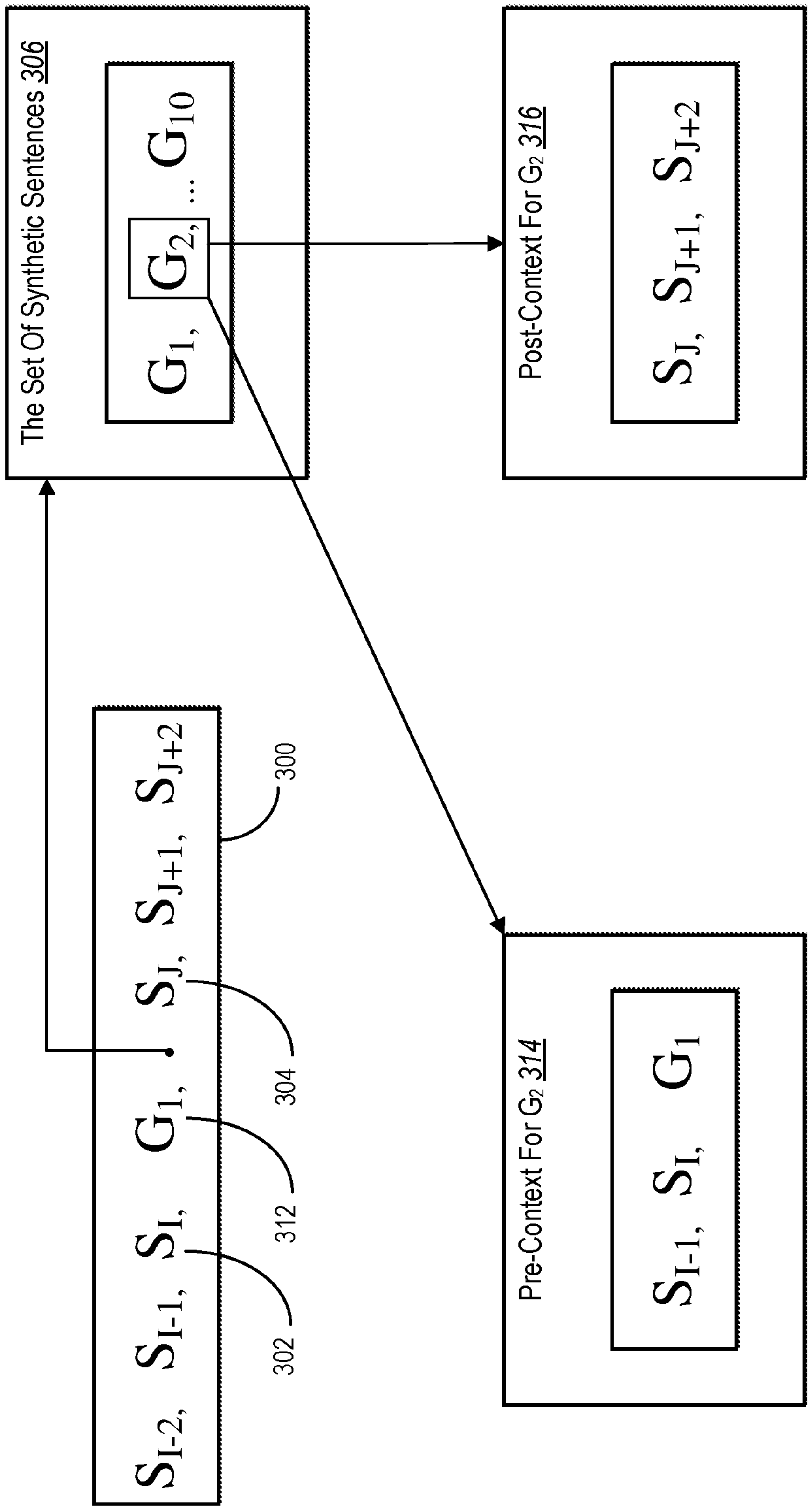

As mentioned above, in certain embodiments, as part of augmenting a dataset for long-range event relation extraction, the long-range event relation system 102 generates synthetic sentences to insert between host sentences of event pairs. To generate synthetic sentences, the long-range event relation system 102 identifies contextual sentences on either of host sentences to feed to a generative language model. FIGS. 3A-3B illustrate the long-range event relation system 102 identifying pre-context and post-context sentences in accordance with one or more embodiments. FIG. 3A shows a portion of a digital document 300 with multiple sentences (e.g., $S_{I-2}, \ldots, S_{J+2}$). Thereafter, FIG. 3B shows the long-range event relation system 102 shifting pre-context sentences in a sliding-window fashion for generating a subsequent synthetic sentence in accordance with one or more embodiments As illustrated in FIG. 3A, the long-range event relation system 102 accesses the digital document 300. In some embodiments, the digital document 300 includes a digital file that is interpretable by a computer to present or display various textual elements, such as characters and sentences. In some cases, the digital document 300 contains textual descriptions of occurrences or events associated with particular topics or subjects. For instance, the digital document 300 includes event descriptions for terms of contracts, ingredients and steps of recipes, instruction manuals, and other types of documents that contain events with complex relationships spanning various sentences in numerous document locations (e.g., across hundreds or thousands of pages).

As just mentioned, the digital document 300 includes or describes at least one event pair. In some embodiments, an event includes a task, a situation, an action, a happening, or an occurrence associated with a particular topic or subject and/or that triggers a particular action or outcome within a digital document. In some cases, an event includes descriptive text or contextual text defining terms, actions, or conditions associated with a particular topic or subject. For a contract document, for example, an event can include one or more of the buying/selling of goods, payment being due upon delivery, the date that triggers late payments, and/or a failure to make a payment. For a recipe, an event can include pre-heating the oven, adding eggs, adding milk, or mixing various ingredients.

In certain embodiments, events within the digital document 300 are part of event pairs. In some embodiments, an event pair includes two or more events, where a first event occurs within a first sentence of a digital document and a second event occurs within a second sentence of a digital document. In some cases, a first event occurs prior to a second event within a digital document. For instance, an event pair includes events that describe a sequence of steps or actions in a particular order to conform with a process or procedure. To illustrate, within a contract, an event pair includes a first event of a date to remit payment (e.g., a specific amount on a specific date) and a second event indicating failure to remit payment (e.g., consequences and conditions that indicate a failure to remit payment). To further illustrate, within a recipe, an event pair includes a first event of adding a first ingredient and a second event of performing an action (e.g., whisking) in response to adding the first ingredient. To illustrate, FIG. 3A shows a subscript I and a subscript J which represent a first event and a second event, respectively.

FIG. 3A shows a first host sentence 302 hosting a first event and a second host sentence 304 hosting a second event. For example, a host sentence includes a sentence within a digital document that includes an event of an event pair. In particular, for an event pair that contains a first event and a second event, the long-range event relation system 102 identifies the first host sentence 302 that contains the first event and the second host sentence 304 that contains the second event.

Further, FIG. 3A further shows the long-range event relation system 102 inserting a set of synthetic sentences 306 between the first host sentence 302 and the second host sentence 304. In particular, the set of synthetic sentences 306 includes sentences generated from a generative language model. Furthermore, the set of synthetic sentences 306 includes a number of sentences that satisfies a long-range event relation threshold and that are contextually coherent within the digital document 300. For instance, the long-range event relation system 102 utilizes, as input for a generative language model, sentences prior to a first event and sentences following a second event to generate contextually coherent synthetic sentences.

As mentioned, the long-range event relation system 102 inserts the set of synthetic sentences 306 between the first host sentence 302 and the second host sentence 304. In particular, the long-range event relation system 102 inserts the set of synthetic sentences 306 between the two host sentences to increase a separation between the first host sentence 302 and the second host sentence 304. For instance, the increase in separation between the first host sentence 302 and the second host sentence 304 transforms the short-range event relation distance to a long-range event relation distance (which satisfies a long-range event relation threshold).

As illustrated in FIG. 3A, in one or more embodiments, the long-range event relation system 102 utilizes a generative language model to generate a first synthetic sentence ($G_1$) to insert between the first host sentence and the second host sentence. Specifically, the long-range event relation system 102 utilizes a generative language model to generate the synthetic sentence from a set of pre-context sentences occurring before the first host sentence 302 and a set of post-context sentences occurring after the second host sentence 304. Likewise, the long-range event relation system 102 generates additional synthetic sentences ($G_2, \ldots, G_{10}$) as well.

As part of the process of generating synthetic sentences, as illustrated in FIG. 3A, the long-range event relation system 102 determines or identifies pre-context sentences 308 in relation to generating the first synthetic sentence ($G_1$). In particular, the pre-context sentences 308 occur prior to the first host sentence 302 that contains the first event. For instance, the pre-context sentences 308 contain explicit and implicit context that inform a generative language model for generating contextually coherent synthetic sentences. To illustrate, FIG. 3A shows the pre-context sentences 308 for the first synthetic sentence as [$S_{I-2}$, $S_{I-1}$, $S_1$].

As a further part of the process of generating synthetic sentences, as illustrated in FIG. 3A, the long-range event relation system 102 determines or identifies a set of post-context sentences 310 in relation to the generation of the first synthetic sentence ($G_1$). In particular, the set of post-context sentences 310 occur after the second host sentence 304 that contains the second event. For instance, the set of post-context sentences 310 also contain explicit and implicit context that inform the generative language model in generating synthetic sentences. To illustrate, FIG. 3A shows the set of post-context sentences 310 for the first synthetic sentence as [$S_J$, $S_{J+1}$, $S_{J+2}$].

As mentioned above, the long-range event relation system 102 shifts (in a sliding-window fashion) contextual bases for generating synthetic sentences. Indeed, FIG. 3B illustrates the long-range event relation system 102 shifting pre-context sentences for the generation of another (e.g., subsequent) synthetic sentence in accordance with one or more embodiments. Based on the above description in relation to FIG. 3A, FIG. 3B shows the digital document 300 with a first synthetic sentence 312 inserted between the first host sentence 302 and the second host sentence 304. Indeed, the long-range event relation system 102 inserts the first synthetic sentence 312 at its specific insertion location between the first host sentence 302 and the second host sentence 304. In some embodiments, the long-range event relation system 102 designates insertion locations for synthetic sentences in an iterative fashion, adding a new sentence for each iteration at a subsequent location immediately adjacent (e.g., to the right) of the sentence before it. In this fashion, the long-range event relation system 102 inserts a second synthetic sentence ($G_2$) after the first synthetic sentence 312, which is inserted after the first host sentence 302.

As mentioned, FIG. 3B shows the long-range event relation system 102 shifting pre-context sentences to generate a second synthetic sentence. For example, the long-range event relation system 102 utilizes a generative language model to generate a second synthetic sentence to insert between the first host sentence 302 and the second host sentence 304 (and after the first synthetic sentence 312) from a modified set of pre-context sentences 314 that includes the first synthetic sentence 312. Indeed, the long-range event relation system 102 modifies a set of pre-context sentences by moving one position to the right for each newly added synthetic sentence.

Indeed, as mentioned, the long-range event relation system 102 successively or iteratively shifts a set of pre-context sentences. Specifically, the long-range event relation system 102 does so by utilizing the generative language model to generate a first synthetic sentence from a first set of pre-context sentences (occurring before the first host sentence 302) and adding the first synthetic sentence to the set of pre-context sentences for generating a second synthetic sentence (thereby removing or replacing the leftmost pre-content sentence to keep the set the same size). Further, the long-range event relation system 102 repeats this process for each successive synthetic sentence to insert between the first host sentence 302 and the second host sentence 304. In some cases, the long-range event relation system 102 maintains the same post-context sentences for generating each synthetic sentence.

Thus, FIG. 3B shows the modified set of pre-context sentences 314 containing [$S_{I-1}$, $S_I$, and $G_1$] and the post-context sentences containing [$S_J$, $S_{J+1}$, $S_{J+2}$]. Specifically, as compared to FIG. 3A, FIG. 3B shows the shifting of the pre-context sentences based on the generation of the first synthetic sentence, in which the long-range event relation system 102 utilizes for generating a second synthetic sentence. Moreover, FIG. 3B shows the post-context sentences 316 for the generation of the second synthetic sentence does not vary as compared to FIG. 3A.

To further illustrate the principles in FIGS. 3A-3B, an illustrative example of the dynamic shifting of the context sentences is given. For example, if one sentence separates the first host sentence 302 containing a first event and the second host sentence 304 containing a second event, the long-range event relation system 102 inserts ten synthetically generated sentences. In particular, for the first synthetic sentence, the pre-context sentences include [$S_{I-2}$, $S_{I-1}$, $S_I$] and the post-context sentences include [$S_J$, $S_{J+1}$, $S_{J+2}$]; for the second synthetic sentence, the pre-context sentences include [$S_{I-1}$, $S_I$, $G_I$] and the post-context sentences include [$S_J$, $S_{J+1}$, $S_{J+2}$]; for a third synthetic sentence, the pre-context sentences include [$S_{I-2}$, $G_1$, $G_2$] and the post-context sentences include [$S_J$, $S_{J+1}$, $S_{J+2}$]; and for a tenth synthetic sentence, the pre-context sentences include [$G_7$, $G_8$, $G_9$] and the post-context sentences include [$S_J$, $S_{J+1}$, $S_{J+2}$].

In one or more embodiments, the long-range event relation system 102 determines long-range event relations for a second digital document. In particular, the long-range event relation system 102 accesses a second digital document from the short-range event relation dataset. In addition, the long-range event relation system 102 generates, utilizing the generative language model, a second set of synthetic sentences to insert between a second event pair within the second digital document. Thus, the long-range event relation system 102 generates the long-range event relation dataset to include a second augmented digital document along with the already augmented digital document. Indeed, the short-range event relation dataset contains multiple documents with multiple event pairs from which the long-range event relation system 102 can induce long-ranges to ultimately generate the long-range event relation dataset.

Figure 4:
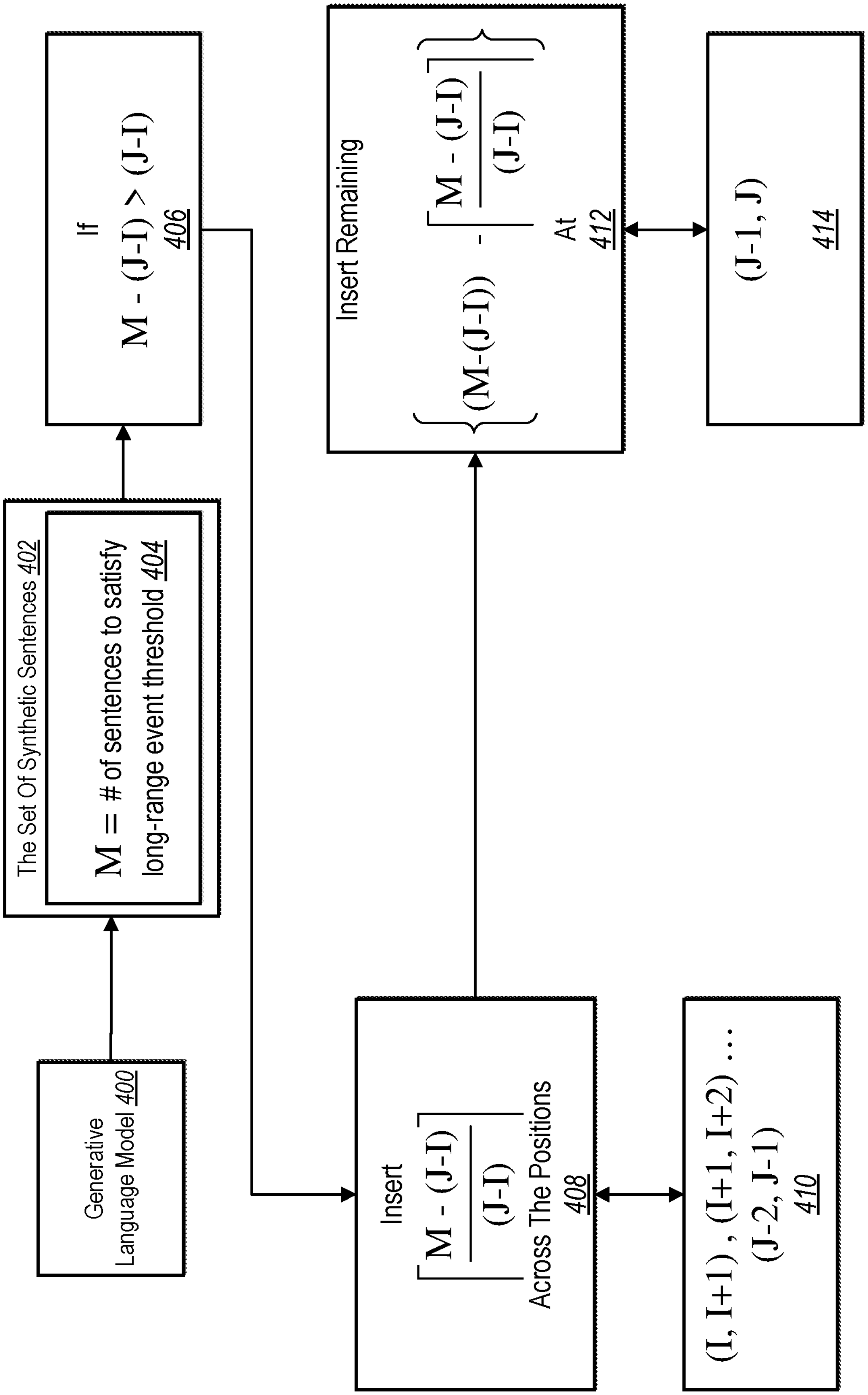
FIG. 4 illustrates a diagram of the long-range event relation system inserting synthetic sentences at various positions in accordance with one or more embodiments.

FIG. 4 illustrates an example diagram of the long-range event relation system 102 inserting synthetic sentences at various positions in accordance with one or more embodiments. For example, FIG. 4 shows the long-range event relation system 102 utilizing a generative language model 400 to generate a set of synthetic sentences 402, as discussed above. More detail regarding the generative language model 400 for generating the set of synthetic sentences 402 is provided here.

In one or more embodiments, the long-range event relation system 102 generates the set of synthetic sentences 402 (e.g., intermediate missing sentences) to semantically and syntactically bridge the surrounding context. In particular, as previously discussed, the long-range event relation system 102 utilizes the generative language model 400 to generate the set of synthetic sentences 402 to fill a gap between host sentences containing related events. To illustrate, the long-range event relation system 102 utilizes the generative language model 400 implemented as an Inter-Sentential Transformer model (INSET) which is described by Huang, Y., Zhang, Y., Elachqar, O., & Cheng, Y. in *INSET: Sentence infilling with Inter-Sentential transformer*, arXiv: 1911.03892 (2019), which is fully incorporated by reference herein.

Moreover, in one or more embodiments, the long-range event relation system 102 utilizes the generative language model 400 in the form of an INSET model which includes, or is based on, a BERT model described by Devlin, J., Chang, M. W., Lee, K., & Toutanova, K. in *Bert: Pre-training of deep bidirectional transformers for language understanding*, arXiv: 1810.04805 (2018), which is fully incorporated by reference herein and/or which also includes, or is further based on aGPT-2 model described by Brown, T., Mann, B., Ryder, N., Subbiah, M., Kaplan, J. D., Dhariwal, P., . . . & Amodei, D. in *Language models are few-shot learners. Advances in neural information processing systems,* 33, 1877-1901 (2020), which is also fully incorporated by reference herein. In some embodiments, an INSET model further includes a denoising autoencoder and a sentence-level transformer, where the denoising autoencoder includes a BERT-based encoder and a GPT-2 based decoder.

In one or more embodiments, the long-range event relation system 102 utilizes an INSET model with an autoencoder to map each sentence to a fixed-length feature vector in a latent semantic space. In addition, the long-range event relation system 102 utilizes the autoencoder to reconstruct the sentence from the latent representation. In some cases, the long-range event relation system 102 utilizes the sentence-level transformer to predict semantic features of synthetic sentences (e.g., missing intermediate sentences to insert) from the pre-context sentences and the post-context sentences.

As mentioned above, the long-range event relation system 102 utilizes the generative language model 400 to generate synthetic sentences over a series or a sequence of successive iterations. For example, rather than generating multiple synthetic sentences at once, in some embodiments, the long-range event relation system 102 utilizes the generative language model 400 to generate a single sentence at a time, given its respective pre-context sentences and the post-context sentences. In addition, the long-range event relation system 102 shifts the pre-context sentences (e.g., discussed above in FIGS. 3A-3B) for generating each successive synthetic sentence to avoid repetitive generation of synthetics sentences (e.g., which sometimes results from generating them all at once). Along these lines, in some cases, the long-range event relation system 102 implements an INSET model (as the generative language model 400) to generate a sentence, augment it according to the context sentences, and to further generate the next synthetic sentence in the sequence (e.g., based on modified pre-context sentences that include the augmented sentence). In some embodiments, as mentioned, the long-range event relation system 102 iteratively repeats to generate a complete set of synthetic sentences (e.g., the set of synthetic sentences 402).

As mentioned, in some embodiments, the long-range event relation system 102 identifies insertion locations for the set of synthetic sentences 402. For example, FIG. 4 shows the long-range event relation system 102 determining a number of sentences to satisfy a long-range event threshold 404. In particular, FIG. 4 shows the number of sentences to satisfy a long-range event threshold 404 as "M." For instance, if M=15, the long-range event relation system 102 inserts a range or a distance of fifteen sentences between a first host sentence and a second host sentence.

As shown in FIG. 4, the long-range event relation system 102 performs an act 406 of determining whether the difference between along-range event threshold and a distance between the first host sentence and the second host sentence is greater than the distance between the first host sentence and the second host sentence. In other words, the long-range event relation system 102 determines a current number of sentences between the first host sentence and the second host sentence and further compares that number of sentences with a number of missing sentences to add, to meet the long-range event relation threshold. To illustrate, FIG. 4 represents this as M−(J−I)>(J−I).

As shown in FIG. 4, based on determining that the number of missing sentences is greater than the distance between host sentences, the long-range event relation system 102 performs an act 408 of inserting a number of sentences across various insertion positions. For example, the long-range event relation system 102 inserts a first number synthetic sentences at a first insertion point defined by the first host sentence, where the first number of synthetic sentences depends on the long-range event relation threshold. Further, the long-range event relation system 102 inserts a second number of synthetic sentences at a second insertion point defined by the second host sentence. To illustrate, FIG. 4 shows this as:

$$\left\lceil \frac{M-(J-I)}{(J-I)} \right\rceil$$

Further, FIG. 4 shows a set of successive insertion positions 410. For example, FIG. 4 shows the insertion positions 410 as (I, I+1), (I+1, I+2) . . . (J−2, J−1). In particular, based on the act 408, the long-range event relation system 102 determines a number of synthetic sentences to insert across the positions shown in the insertion positions 410.

Moreover, FIG. 4 shows the long-range event relation system 102 performing an act 412 of inserting a number of remaining sentences across insertion positions. In particular, the long-range event relation system 102 determines the remaining number of sentences based on leftover synthetic sentences of the set of synthetic sentences 402 that have not yet been inserted at the insertion positions 410. For instance, FIG. 4 shows the long-range event relation system 102 determining the remaining number of sentences according to:

$$\left\{\left(M-(J-I)-\left\lceil\frac{M-(J-I)}{(J-I)}\right\rceil\right)\right\}$$

Further, FIG. 4 shows an insertion position 414. Specifically, for the act 412, the long-range event relation system 102 inserts the remaining synthetic sentences at the (final) insertion position 414. For instance, FIG. 4 shows the insertion position 414 as (J−1, J).

The following describes a step-by-step algorithmic approach for inserting the set of synthetic sentences 402 between the first host sentence and the second host sentence. For example, the step-by-step approach includes an input event relation dataset (D) that contains annotations for related events that are m sentences apart on average. In particular D includes the short-range dataset and D' includes the output synthetically augmented dataset, in other words D' includes the long-range dataset with related events n sentences apart on average.

For example, D contains multiple documents. In particular, D contains multiple documents with each document containing an ordered collection of sentences. To illustrate, the ordered collection of sentences within a document d can be represented by $<s_1, s_2, \ldots, s_n>$, where n indicates the total number of sentences.

Further, M represents the minimum number of sentences to satisfy the long-range event relation threshold. In other words, M represents the number of sentences present between any given pair of related events for the dataset to be considered a long-range dataset. Moreover, G represents the generative language model 400 to generate intermediate synthetically sentences, given the surrounding context. Additionally, I represents a first host sentence at a first location within d, J represent a second host sentence at a second location within d, $e_i$ represents a first event in the first host sentence and $e_j$ represents a second event in the second host sentence (e.g., I and J refer to a sentence number within the document d).

In one or more embodiments, for each event pair $(e_i, e_j)$ in d where I<J, if I==J or I<3 or J>N−3, then the long-range event relation system 102 does not utilize G, the generative language model 400, to generate the set of synthetic sentences 402. In particular, the long-range event relation system 102 does not synthetically augment d that satisfies the just mentioned conditions. On the contrary, if d does not satisfy the just mentioned conditions and if (J−I)>0, then the long-range event relation system 102 uniformly inserts (M−(J−I)) sentences between I and J, the first host sentence and the second host sentence by utilizing G which accounts for the pre-context sentences and the post-context sentences. In other words, the long-range event relation system 102 inserts a total number of sentences that satisfies the long-range event relation threshold. Specifically, the long-range event relation system 102 utilizes the description above for elements 404-414 of FIG. 4 to insert the sentences between the first host sentence I and the second host sentence J.

In one or more embodiments, if the long-range event relation system 102 fails to satisfy the condition (J−I)>0 and (M−(J−I))<(J−I), the long-range event relation system 102 performs a different set of acts. In particular, the long-range event relation system 102 randomly selects (M−(J−I)) positions in {(I, I+1), (I+1, I+2), . . . , (J−1, J)} and inserts one sentence each in the selected positions.

To provide a concrete illustration of sentence generation with pre-context sentences and post-context sentences, when J=I+3, the long-range event relation system 102 can determine to insert eight sentences between I and J. In particular, the long-range event relation system 102 inserts three sentences between $[S_I, S_{I+1}]$, three sentences between $[S_{I+1}, S_{I+2}]$, and three sentences between $[S_{I+2}, S_J]$. Moreover, the long-range event relation system 102 utilizes for $G_I$, $[S_I, S_{I+1}]$ pre-context sentences as $[S_{I-2}, S_{I-1}, S_I]$ and post-context sentences as $[S_{I+1}, S_{I+2}, S_J]$. Further, for, the long-range event relation system 102 utilizes for $G_2$. $[S_{I-1}, S_I, G_I]$ as pre-context sentences and $[S_{I+1}, S_{I+2}, S_J]$ as post-context sentences, and so forth.

To provide a concrete example of synthetic sentence insertion, where M=15 and diff (e.g., J−I)=4, then (J−I)>0. For example, the long-range event relation system 102 utilizing $$\left\lceil\frac{M-(J-I)}{(J-I)}\right\rceil$$

determines utilizing a ceiling function that (11/4)=3. In particular, the long-range event relation system 102 inserts 3 sentences total between (I, I+1), (I+1, I+2), and (I+2, I+3). Moreover, with the insertion of 3 sentences, the long-range event relation system 102 has 8 remaining $$\left\{\left(M-(J-I)-\left\lceil\frac{M-(J-I)}{(J-I)}\right\rceil\right)\right\}$$

sentences to insert. Specifically, the long-range event relation system 102 utilizing determines (11−3)=8. Accordingly, the long-range event relation system 102 inserts a total of the 8 remaining sentences between (J−1, J). By varying the insertion positions, the long-range event relation system 102 avoids repetitions in generating synthetic sentences by utilizing different pre-context sentences and post-context sentences.

As already mentioned above, the long-range event relation system 102 implements an INSET model with a top-k strategy. To further illustrate the benefit of the long-range event relation system 102 utilizing the top-k strategy as compared to a beam search strategy, the following table is provided:

| Pre and post contexts | <FILL> with INSET with beam search | <FILL> with INSET with top-k sampling |
| --- | --- | --- |
| Now with new construction under way, three of his buyers have backed out. There is now | There 100 m of property is waiting in the Chinese market, rather than many investors. | Unlike China, the homes are already selling large sums of debts to Renee Power in Hong |

-continued

| Pre and post contexts | <FILL> with INSET with beam search | <FILL> with INSET with top-k sampling |
|---|---|---|
| a buyer of Hong Kong's skyscrapers, so far only to close. There 100 m of property is waiting In the Chinese market, rather than many investors. <FILL> And Wong Kwan will be lucky to break even. All across Hong Kong, the property market has crashed. Pamela Pak owns eight condominiums here. | | Kong. |

In particular, when the long-range event relation system 102 utilizes the INSET model with the beam search strategy as its decoder, of the long-range event relation system 102 generates synthetic sentences word-by-word. In particular, by using a beam search strategy, the long-range event relation system 102 generates sentences from left-to-right while keeping a fixed number of active candidates at each step to condition the generation of the next time step. Accordingly, in one or more embodiments, the long-range event relation system 102 utilizes the beam search strategy to find a highly likely overall sequence. In some embodiments, the long-range event relation system 102 implements an INSET model with a greedy search, which sometimes results in missing hidden high probability sequences.

In one or more embodiments, by implementing an INSET model with top-k strategy with temperature (e.g., k=50, temperature=0.75), the long-range event relation system 102 filters the k most likely next words, and further redistributes the probability mass among the k next words. In particular, temperature scaling decides the sharpness of the distribution (e.g., decreasing the temperature makes the model more confident and less random about the predicted words). Moreover, using the INSET model with top-k strategy, the long-range event relation system 102 generates synthetic sentences to i) be longer than a specific number of tokens (e.g., N=10) to prevent incoherent generations for short sentences, and ii) to avoid inclusion of any punctuation (e.g., question marks or exclamation marks) and special symbols in the generated sentence until the minimum length of the sentence is generated.

Accordingly, as shown in the above table, the long-range event relation system 102 increases the coherency with the pre-context sentences and the post-context sentences with fewer repetitions and more diversity. Thus, in some embodiments, the long-range event relation system 102 efficiently and accurately trains an event relation extraction model to determine long-range events by using an INSET model with a top-k strategy.

Figure 5:
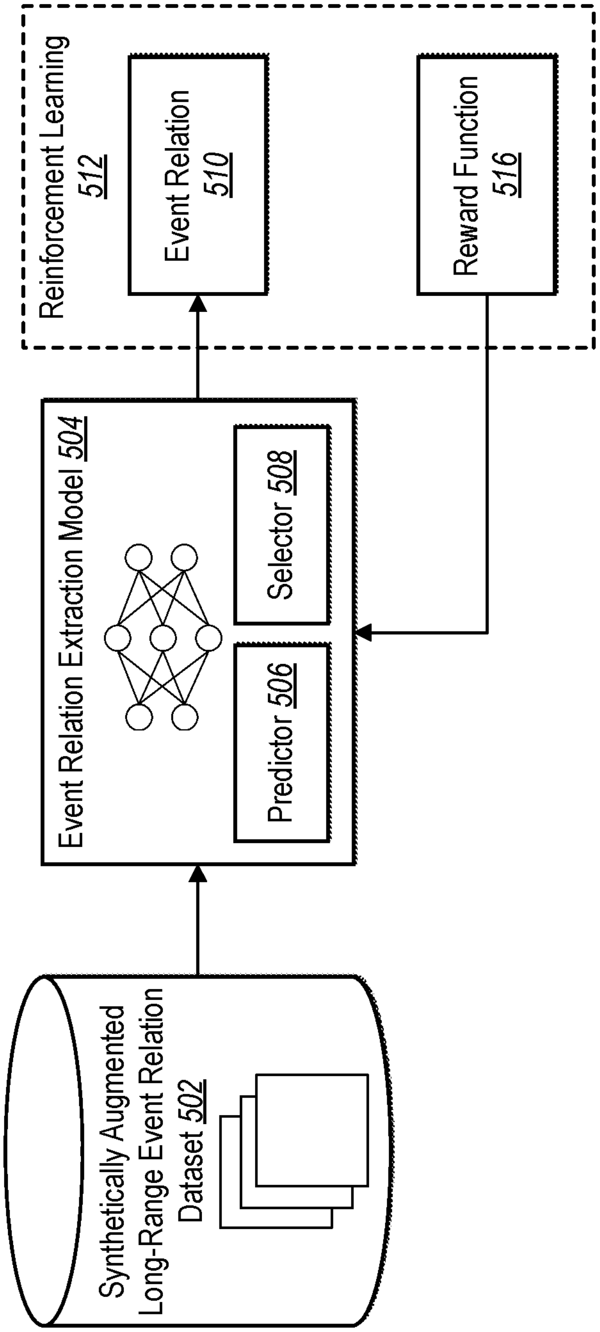
FIG. 5 illustrates a diagram of the long-range event relation system training an event relation extraction model in accordance with one or more embodiments.

As mentioned above, in certain embodiments, the long-range event relation system 102 trains an event relation extraction model to generate event relation graphs. For example, the long-range event relation system 102 trains an event relation extraction model using a reinforcement learning technique. FIG. 5 illustrates the long-range event relation system 102 training an event relation extraction model in accordance with one or more embodiments. For example, FIG. 5 shows the long-range event relation system 102 training an event relation extraction model 504 using a synthetically augmented long-range event relation dataset 502.

As shown in FIG. 5, the long-range event relation system 102 utilizes the event relation extraction model 504 to process the synthetically augmented long-range event relation dataset 502. In particular, the long-range event relation system 102 via the event relation extraction model 504 processes the synthetically augmented long-range event relation dataset 502 to learn parameters pertaining to long-range event relations. In one or more embodiments, the event relation extraction model 504 includes a machine learning model such as a neural network.

In one or more embodiments a machine learning model includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

A neural network includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a graph neural network, a diffusion neural network, or a multi-layer perceptron. In some embodiments, a neural network includes a combination of neural networks or neural network components. For instance, in some embodiments, the event relation extraction model 504 is an SCS-EERE network, as described by Man, H., Ngo, N. T., Van, L. N., & Nguyen, T. H. in *Selecting optimal context sentences for event-event relation extraction*, Proceedings of the AAAI Conference on Artificial Intelligence, Vol. 36, No. 10, pp. 111058-11066 (June 2022), which is fully incorporated by reference herein.

As shown, in one or more embodiments, the event relation extraction model 504 includes a predictor 506 and a selector 508. In particular, the predictor 506 predicts event relations between events of digital documents. For instance, the long-range event relation system 102 utilizes the predictor 506 to encode relationships between events in a document.

In some embodiments, the predictor 506 also includes a two-layer feedforward network and a softmax layer to determine a distribution over the possible relations between two events. Furthermore, the long-range event relation system 102 trains the predictor 506 utilizing a negative-log likelihood. To illustrate, the long-range event relation system 102 implements the predictor 506 as a ROBERTa model which is described by Liu, Y., Ott, M., Goyal, N., Du, J., Joshi, M., Chen, D., . . . & Stoyanov., V. in *Roberta: A robustly optimized bert pretraining approach*, arXiv: 1907.11692 (2019), which is fully incorporated by reference herein.

Moreover, in one or more embodiments, the selector 508 acts as an important sentence selector. In particular, the long-range event relation system 102 utilizes the selector 508 to select the most important context sentences for event relation prediction between a pair of events. For instance, the long-range event relation system 102 utilizes prediction performance of the predictor 506 to guide the sentence selection by the selector 508. As an example, the long-range event relation system 102 considers a sentence as important if including it as context leads to improvement in the performance of the predictor 506 for the pair of events. Specifically, the long-range event relation system 102 trains the selector 508 with a REINFORCE algorithm that treats the prediction performance of the predictor 506 as a reward. For example, the REINFORCE algorithm is described by Williams, R. J. in *Simple Statistical Gradient-Following Algorithms for Connectionist Reinforcement Learning*, Kluwer Academic (1992), which is fully incorporated by reference herein.

Additionally, in one or more embodiments, using the REINFORCE algorithm to train the selector 508 includes utilizing a performance-based reward function. In particular, the long-range event relation system 102 determines a performance-based reward from the relation prediction performance of the predictor 506. To illustrate, as shown in FIG. 5, during training, the long-range event relation system 102 utilizes the predictor 506 to predict probabilities of relations between two events within the synthetically augmented long-range event relation dataset 502. Further, the long-range event relation system 102 utilizes the selector 508 to select context sentences, which is guided by the predicted probabilities of relations between two events. Based on the correctness of predicted probabilities of related events by the predictor 506, the long-range event relation system 102 determines a performance-based reward to incentivize/disincentivize the selector 508 for certain behaviors (e.g., selecting context sentences). Accordingly, the long-range event relation system 102 generates a set of synthetic sentences to satisfy the performance-based reward function.

As shown in FIG. 5, the long-range event relation system 102 utilizes the event relation extraction model 504 to generate an event relation 510 (e.g., between two events of the synthetically augmented long-range event relation dataset 502) and utilizes reinforcement learning 512 (e.g., the REINFORCE algorithm). In some embodiments, the reinforcement learning 512 includes reward predictions over successive training iterations to increase or maximize the correct selection of context sentences. In one or more embodiments, the long-range event relation system 102 trains the event relation extraction model 504 with 8 epochs with a batch size of 16 and a maximum sequence length of 512.

Further, as shown, the long-range event relation system 102 modifies parameters of the event relation extraction model 504 by utilizing a reward function 516 (e.g., as part of the reinforcement learning process). In particular, the long-range event relation system 102 trains the event relation extraction model 504 by learning model parameters from the synthetically augmented long-range event relation dataset 502 via the reward function 516. In some cases, the long-range event relation system 102 trains the selector 508 using reward functions such as a context-based reward and a knowledge-based reward. Specifically, the context-based reward ensures or encourages that a sentence with more similar contextual semantics to those of the event pair in the host sentences is preferred to be included as context sentences. Further, knowledge-based reward ensures or encourages retrieving semantic word representations for a similarity-based reward instead of contextual semantics. For instance, the knowledge-based reward integrates ConceptNet which is described by Speer, R.; Chin, J.; and Havasi, C. in *ConceptNet 5.5: An Open Multilingual Graph of General Knowledge*, AAAI (2017), which is fully incorporated by reference herein. However, in one or more embodiments, the long-range event relation system 102 only utilizes the performance-based reward function and removes (or excludes) the context-based reward and the knowledge-based reward. Specifically, the long-range event relation system 102 removes the context-based and knowledge-based rewards because the synthetically augmented long-range event relation dataset 502 does not include event mentions in selected sentences (e.g., the long-range event relation system 102 synthetically generates sentences for the synthetically augmented long-range event relation dataset 502, thus the sentences are not annotated for event mentions).

Figure 6:
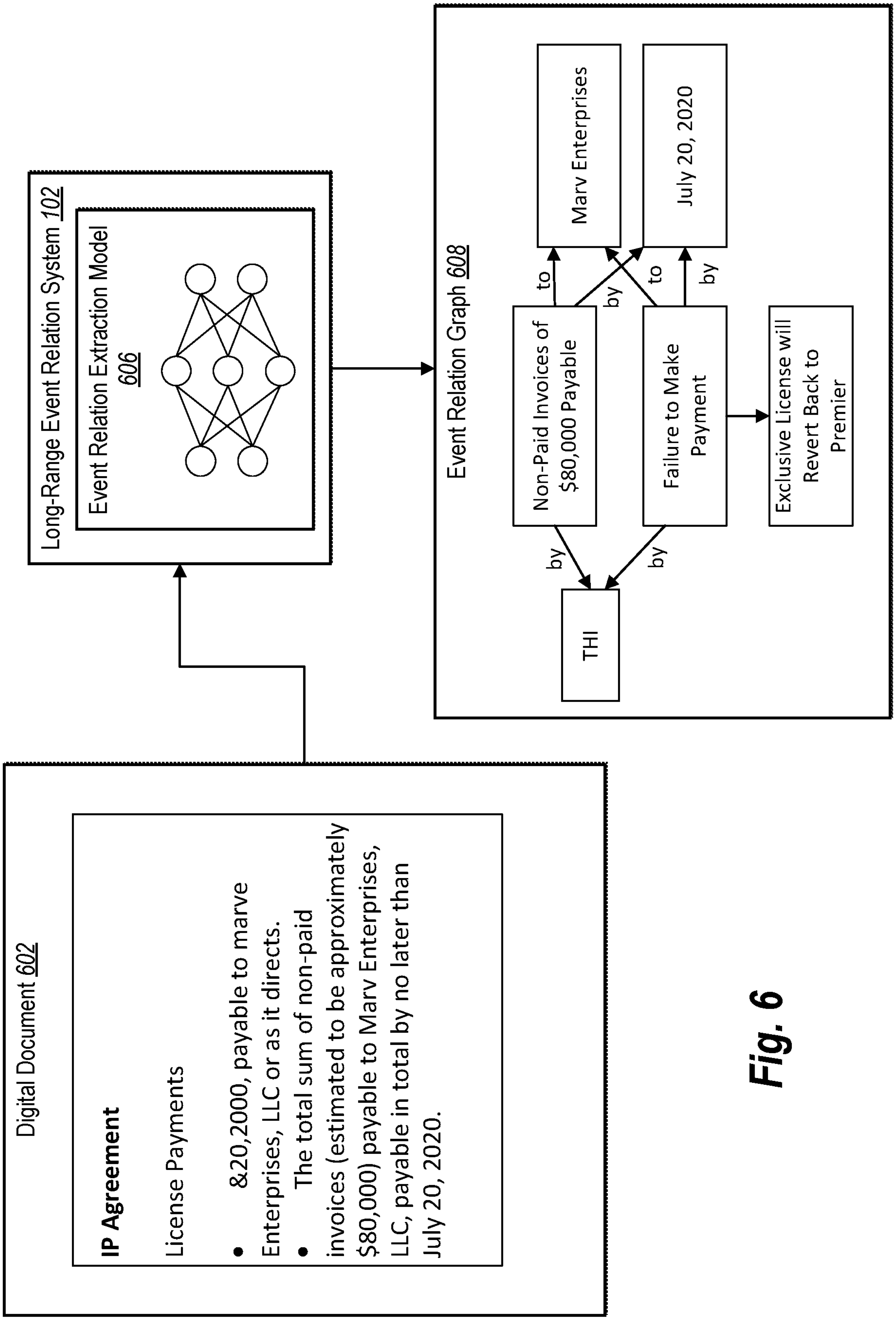
FIG. 6 illustrates a diagram of the long-range event relation system implementing a trained event relation extraction model to generate an event relation graph in accordance with one or more embodiments.

As mentioned above, in certain embodiments, the long-range event relation system 102 generates an event relation graph from a digital document. In particular, the long-range event relation system 102 generates an event relation graph using an event relation extraction model. FIG. 6 illustrates an implementation of an event relation extraction model trained according to the description provided in relation to FIGS. 1-5. For example, FIG. 6 shows the long-range event relation system 102 utilizing an event relation extraction model to generate an event relation graph in accordance with one or more embodiments. In particular, the long-range event relation system 102 implements an event relation extraction model 606 to identify and extract event relations from long domain-specific documents (e.g., digital documents with long-range event pairs). For instance, long domain-specific documents include contracts and financial reports.

As shown, in one or more embodiments, the long-range event relation system 102 utilizes the event relation extraction model 606 to extract event relations to construct event logic graphs or event relation graphs. In particular, the long-range event relation system 102 utilizes the event logic graph to provide a structured understanding of complex documents and further provides options for performing downstream tasks. For instance, the long-range event relation system 102 generates event logic graphs and provides downstream applications such as i) summarization or visualization of complex processes described within the document, ii) automation of document processes based on logic extracted into the event logic graph (e.g., automatically curating and sending email notices), or iii) automation of answering queries pertaining to processes described in the document.

FIG. 6 shows the long-range event relation system 102 processing a digital document 602. In particular, FIG. 6 shows the long-range event relation system 102 generates an event relation graph 608 (e.g., an event logic graph) from the digital document 602. For instance, the event relation graph 608 includes a visual indication of the temporal or causal relationship between two or more events within host sentences of the digital document 602. Indeed, the long-range event relation system 102 extracts related events from the digital document 602, determines the relationship between the related events and visually represents the relationship within the event relation graph 608. As shown, the event relation graph 608 includes nodes representing events and edges representing relationships between nodes/events.

In some embodiments, the long-range event relation system 102 provides the generated event relation graph 608 for display on a client device. For instance, the long-range event relation system 102 provides the event relation graph 608 for display to visualize complex relationships within the digital document 602. Specifically, the event relation graph 608 indicates potential actions to take in case a payment is not made by a given date. Accordingly, once the long-range event relation system 102 has processed the digital document 602, a user of a client device can send queries pertaining to processes within the digital document 602. Moreover, the long-range event relation system 102 can provide responses to the query based on determined relationships via the event relation graph 608.

In one or more embodiments, the long-range event relation system 102 implements the event relation extraction model 606 for complex downstream tasks. In particular, the long-range event relation system 102 implements the event relation extraction model 606 for post-signing contract automation workflows. For instance, the post-signing contract automation workflows include identifying various actions within a contract or processes that need to be undertaken upon external events. Specifically, processes that need to be undertaken include payment processes, post-termination processes, or cancellation processes. Furthermore, the long-range event relation system 102 can implement the event relation extraction model 606 for other workflows such as signature applications or other complicated processes where a visualization (e.g., the event relation graph 608) aids a user in understanding the document.

As mentioned above, in certain embodiments, the long-range event relation system 102 provides accuracy improvements over prior systems. Indeed, experimenters have demonstrated accuracy improvements of the long-range event relation system 102. FIG. 7 illustrates example results of a number of sentences between event pairs in datasets of prior systems in accordance with one or more embodiments. For example, FIG. 7 shows F1 scores 704 of an event relation extraction model trained on a short-range dataset that contains event annotations and temporal relations. For instance, the F1 score is a harmonic mean of precision and recall where 1.0 indicates perfect precision and recall. In particular, the table in FIG. 7 shows prior systems training on a TDDMan dataset which is described in Naik, A., Breitfeller, L., & Rose, C. (2019 September). TDDisclosure: A dataset for disclosure-level temporal ordering of events. In Proceedings of the 20$^{th}$ Annual SIGdial Meeting on Disclosure and Dialogue (pp. 239-249), which is fully incorporated herein by reference.

Specifically, FIG. 7 shows the performance of an event relation extraction model in prior systems trained on TDDMan over test bins 700. For instance, each bin of the test bins 700 contains test examples with event relations ranging over a range of sentences (e.g., a distance between events [m, n) where m and n refer to the minimum and maximum number of sentences between two related events respectively). In particular, the test bin corresponding to [15, 22) contains the fewest number of test samples 702 as compared to the other test bins (e.g., the training dataset does not contain many long-range event relation annotations). Furthermore, the F1 scores 704 corresponding to the [15, 22) bin is much lower than the F1 scores 704 of the other test bins, thus indicating a low level of performance for extracting/identifying long-range relations between event pairs.

As part of improving over the systems whose results are shown in FIG. 7, the long-range event relation system 102 augments training data to include long-range event pairs. FIG. 8 illustrates a comparison of training data between a short-range dataset of prior systems and a synthetically augmented long-range relation dataset of the long-range event relation system 102. For example, FIG. 8 shows a comparison between original 800 (e.g., prior system datasets) and augmented 802 (e.g., the long-range event relation system 102 training an event relation extraction model). In particular, as mentioned above, the original 800 dataset includes TDDMan which contains manually labelling of relations using document cues, word knowledge, and causality. The original 800 dataset contains 6150 pairs of related events manually annotated by expert human annotators. On the other hand, the augmented 802 dataset (e.g., augmented by the long-range event relation system 102) contains synthetically induced long-ranges based on the principles discussed above.

As shown in FIG. 8, the average number of sentences between two related events is much greater for the augmented 802 dataset. Further, the median number of sentences between two related events is also much greater for the augmented 802 dataset. Moreover, the perplexity scores from BERT indicate a pre-trained language model to determine the flow and naturalness of sentences. As shown, the scores for the original 800 versus the augmented 802 are within the same range, thus the augmented 802 dataset more or less contains a natural flow in comparison with the original 800 dataset.

Figure 9:
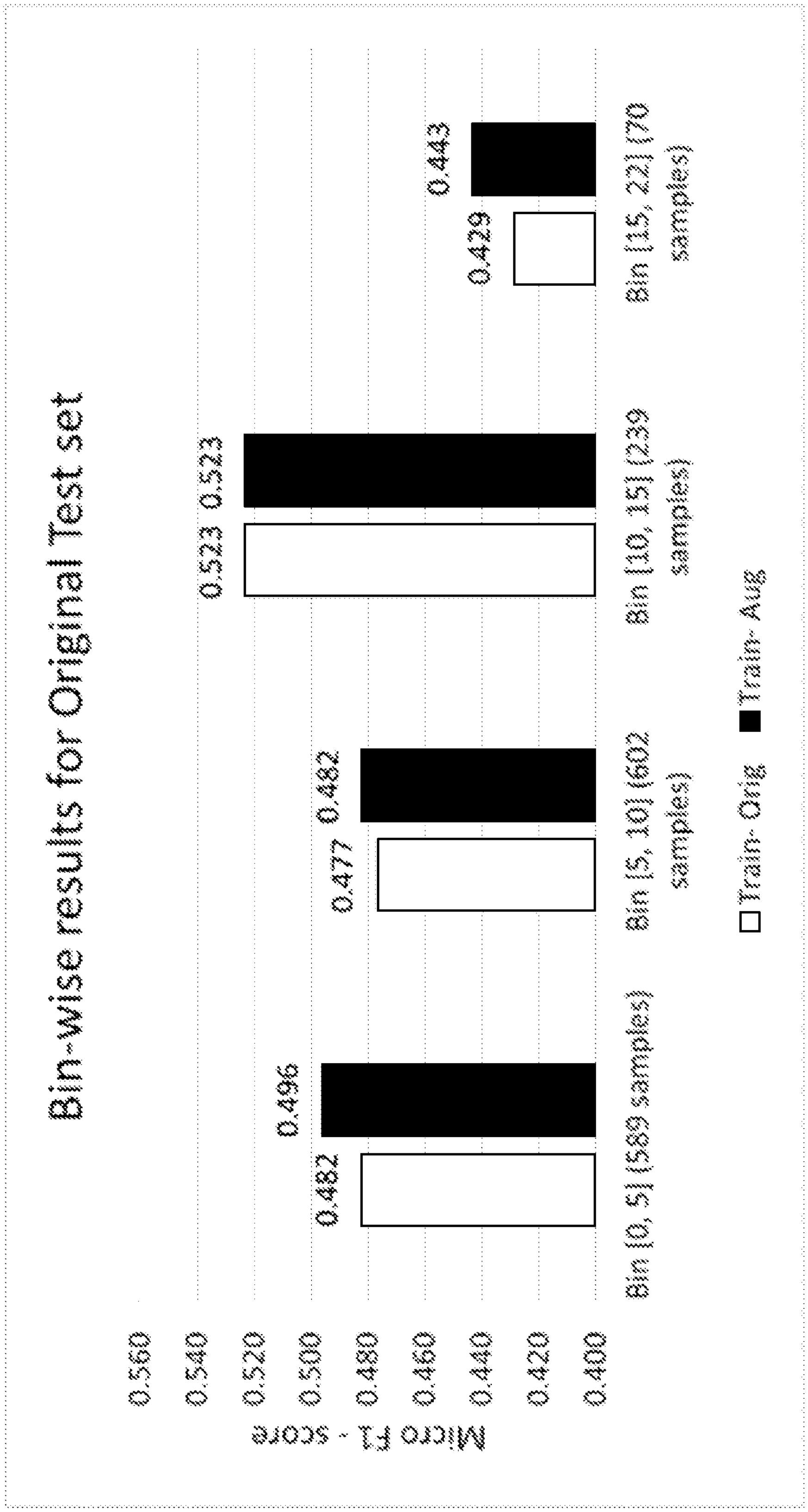
FIG. 9 illustrates an example graph of F1 scores between various systems in accordance with one or more embodiments.

Based on training an event relation extraction model using the augmented data (whose metrics are shown in FIG. 8), the long-range event relation system 102 provides improved accuracy over prior systems. FIG. 9 illustrates an example graph of F1 scores between prior systems trained on short-range datasets and the long-range event relation system 102 trained on its augmented long-range dataset. As shown in FIG. 9, experimenters divide the test examples into four bins [0, 5), [5, 10), [10, 15), and [15, 22) sentences in each of the bins. The graph of FIG. 9 further shows the results for each bin. Accordingly, FIG. 9 illustrates the long-range event relation system 102 dataset of synthetic augmentation versus prior system datasets broken down into various bins (e.g., sentence lengths between related events). To illustrate, the bin-wise micro F1 scores trained on the augmented training set (e.g., the long-range event relation system 102) show superior results for each bin and equal results for the [10, 15) bin. Notably, for the [15, 22) bin, the augmented dataset shows higher performance which indicates the long-range event relation system 102 helps the event relation extraction model in performing longer-range event relation extraction.

Figure 10:
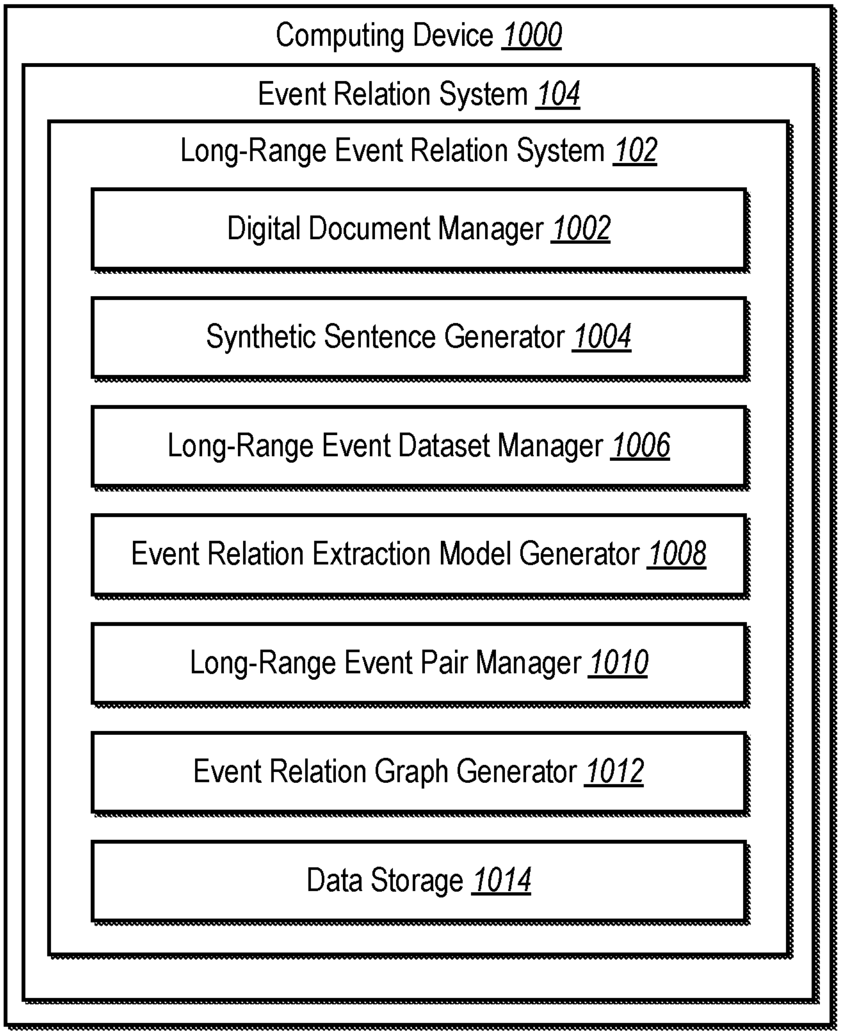
FIG. 10 illustrates an example schematic diagram of the long-range event relation system in accordance with one or more embodiments.

Turning to FIG. 10, additional detail will now be provided regarding various components and capabilities of the long-range event relation system 102. In particular, FIG. 10 illustrates an example schematic diagram of a computing device 1000 (e.g., the server(s) 106 and/or the client device 110) implementing the long-range event relation system 102 in accordance with one or more embodiments of the present disclosure for components 1000-1014. As illustrated in FIG.

10, the long-range event relation system 102 includes a digital document manager 1002, a synthetic sentence generator 1004, a long-range event dataset manager 1006, an event relation extraction model generator 1008, a long-range event pair manager 1010, an event relation graph generator 1012, and a data storage 1014.

The digital document manager 1002 accesses one or more digital documents. For example, the digital document manager 1002 accesses the digital document(s) from a short-range event relation dataset. In particular, the digital document manager 1002 accesses digital document(s) with event pairs that include a first event within a first host sentence and a second event within a second host sentence. Moreover, the digital document manager 1002 interacts with other components to pass the accessed digital document(s) for further processing.

The synthetic sentence generator 1004 generates a set of synthetic sentences. For example, the synthetic sentence generator 1004 receives the digital document from the digital document manager 1002 and based on the event pair, generates a set of synthetic sentences. In particular, the synthetic sentence generator 1004 generates synthetic sentences for inserting the set of synthetic sentences within the digital document between the first host sentence and the second host sentence. Moreover, the synthetic sentence generator 1004 determines a number of sentences to generate as the set of synthetic sentences to satisfy a long-range event relation threshold. Specifically, the synthetic sentence generator 1004 passes the generated set of synthetic sentences to the long-range event dataset manager 1006.

The long-range event dataset manager 1006 receives the generated set of synthetic sentences from the synthetic sentence generator 1004. For example, the long-range event dataset manager 1006 generates the long-range event relation dataset by augmenting the digital document to include the set of synthetic sentences. Specifically, the long-range event dataset manager 1006 includes the set of synthetic sentences between the first host sentence and the second host sentence within the digital document.

The event relation extraction model generator 1008 generates an event relation extraction model. For example, the event relation extraction model generator 1008 receives the long-range event relation dataset and generates the event relation extraction model to determine long-range event relations from digital documents. In particular, the event relation extraction model generator 1008 learns model parameters for the event relation extraction model from the long-range event relation dataset.

The long-range event pair manager 1010 determines a long-range event pair. For example, the long-range event pair manager 1010 accesses a digital document with event pairs and determines the long-range event pair that includes the first sentence and the second sentence. In particular, the long-range event pair manager 1010 determines the long-range event pair by utilizing an event relation extraction model.

The event relation graph generator 1012 generates event relation graphs. For example, the event relation graph generator 1012 receives determinations of long-range event pairs from the long-range event pair manager 1010. In particular, the event relation graph generator 1012 generates an event relation graph that indicates the long-range event relation between the long-range event pair. Moreover, the event relation graph generator 1012 passes the generated event relation graph to a user of a client device or passes the event relation graph for downstream tasks.

The data storage 1014 stores datasets, documents, event relations, and event relation graphs. For example, the data storage 1014 stores digital documents accessed from the short-range event relation dataset and stores an augmented long-range event relation dataset. Further, the data storage 1014 stores determined event relations and also stores generated event relation graphs.

Each of the components 1002-1014 of the long-range event relation system 102 can include software, hardware, or both. For example, the components 1002-1014 can include one or more instructions stored on a computer-readable storage medium and executable by processors of one or more computing devices, such as a client device or server device. When executed by the one or more processors, the computer-executable instructions of the long-range event relation system 102 can cause the computing device(s) to perform the methods described herein. Alternatively, the components 1002-1014 can include hardware, such as a special-purpose processing device to perform a certain function or group of functions. Alternatively, the components 1002-1014 of the long-range event relation system 102 can include a combination of computer-executable instructions and hardware.

Furthermore, the components 1002-1014 of the long-range event relation system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1014 of the long-range event relation system 102 may be implemented as a stand-alone application, such as a desktop or mobile application. Furthermore, the components 1002-1014 of the long-range event relation system 102 may be implemented as one or more web-based applications hosted on a remote server. Alternatively, or additionally, the components 1002-1014 of the long-range event relation system 102 may be implemented in a suite of mobile device applications or "apps." For example, in one or more embodiments, the long-range event relation system 102 can comprise or operate in connection with digital software applications such as ADOBE® ACROBAT, ADOBE® ACROBAT PRO, ADOBE® INDESIGN, ADOBE® XD, ADOBE® EXPRESS, ADOBE® FONTS, ADOBE® INCOPY, ADOBE® DOCUMENT CLOUD, and/or ADOBE® EXPERIENCE CLOUD. The foregoing are either registered trademarks or trademarks of Adobe Inc. in the United States and/or other countries.

Figure 11:
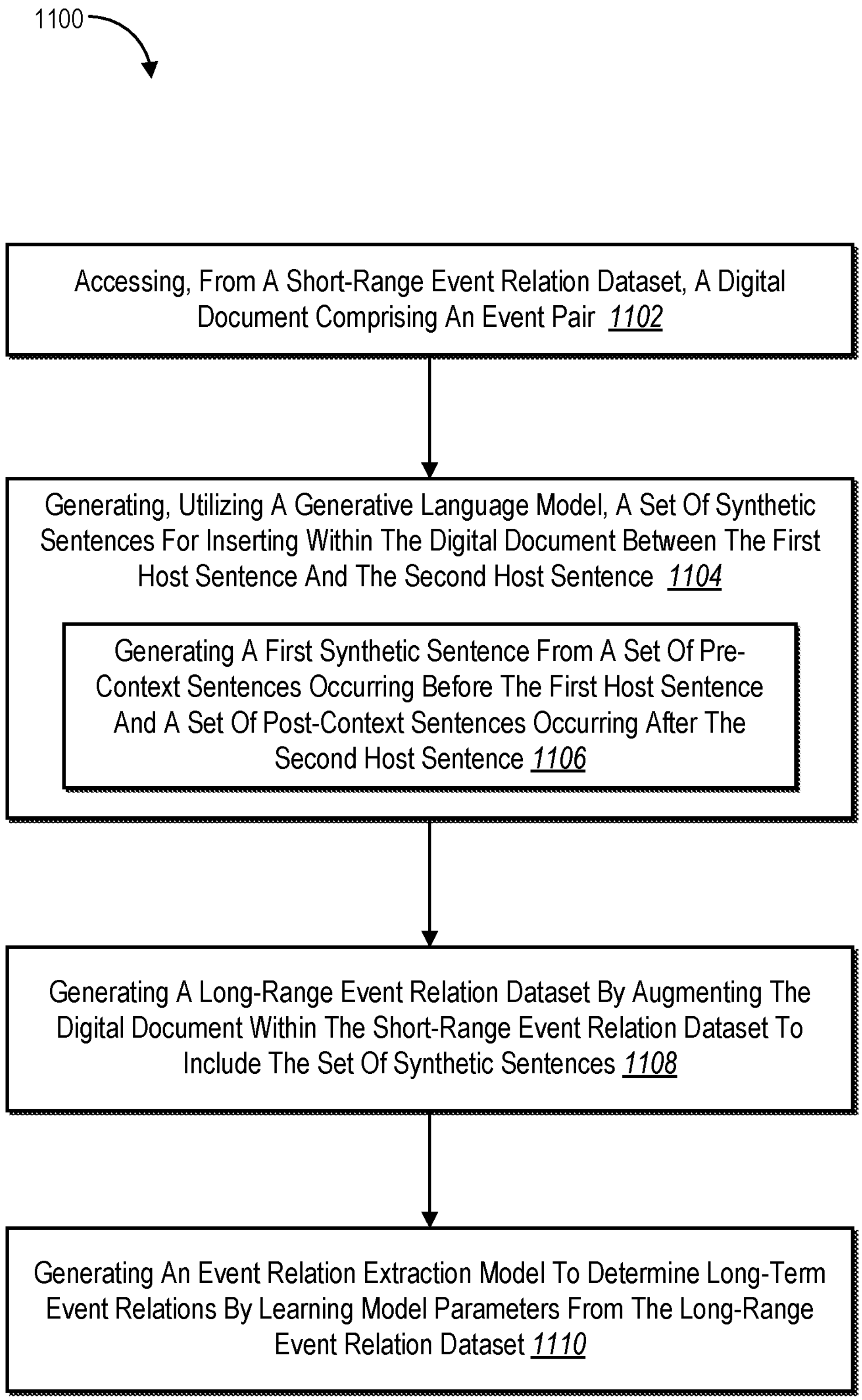
FIG. 11 illustrates a flowchart of a series of acts for generating an event relation extraction model in accordance with one or more embodiments.

FIGS. 1-10, the corresponding text, and the examples provide a number of different methods, systems, devices, and non-transitory computer-readable media of long-range event relation system 102. In addition to the foregoing, one or more embodiments can also be described in terms of flowcharts comprising acts for accomplishing the particular result, as shown in FIG. 11. FIG. 11 may be performed with more or fewer acts. Further, the acts may be performed in different orders. Additionally, the acts described herein may be repeated or performed in parallel with one another or in parallel with different instances of the same or similar acts.

FIG. 11 illustrates a flowchart of a series of acts 1100 for generating an event relation extraction model in accordance with one or more embodiments. FIG. 11 illustrates acts according to one embodiment, alternative embodiments may omit, add to, reorder, and/or modify any of the acts shown in FIG. 11. In some implementations, the acts of FIG. 11 are performed as part of a method. For example, in some embodiments, the acts of FIG. 11 are performed as part of a computer-implemented method. Alternatively, a non-transitory computer-readable medium can store instructions thereon that, when executed by at least one processor, cause a computing device to perform the acts of FIG. 11. In some embodiments, a system performs the acts of FIG. 11. For example, in one or more embodiments, a system includes at least one memory device. The system further includes at least one server device configured to cause the system to perform the acts of FIG. 11.

The series of acts 1100 includes an act 1102 of accessing, from a short range event relation dataset, a digital document comprising an event pair, an act 1104 of generating, utilizing a generative language model, a set of synthetic sentences for inserting within the digital document between the first host sentence and the second host sentence, a sub-act 1106 of generating a first synthetic sentence from a set of pre-context sentences occurring before the first host sentence and a set of post-context sentences occurring after the second host sentence, an act 1108 of generating a long-range event relation dataset by augmenting the digital document within the short-range event relation dataset to include the set of synthetic sentences, and an act 1110 of generating an event relation extraction model to determine long-range event relations by learning model parameters from the long-range event relation dataset.

In particular, the act 1102 can include accessing, from a short-range event relation dataset, a digital document comprising an event pair that includes a first event within a first host sentence of the digital document and a second event within a second host sentence within the digital document, the act 1104 includes generating, utilizing a generative language model, a set of synthetic sentences for inserting within the digital document between the first host sentence and the second host sentence to separate the event pair by a number of sentences that satisfies a long-range event relation threshold, the act 1108 includes generating a long-range event relation dataset by augmenting the digital document within the short-range event relation dataset to include the set of synthetic sentences between the first host sentence and the second host sentence, and the act 1110 includes generating an event relation extraction model to determine long-range event relations from digital documents by learning model parameters for the event relation extraction model from the long-range event relation dataset.

For example, in one or more embodiments, the series of acts 1100 includes inserting the set of synthetic sentences between the first host sentence and the second host sentence uniformly across a plurality of insertion locations. In addition, in one or more embodiments, the series of acts 1100 includes inserting the set of synthetic sentences between the first host sentence and the second host sentence to increase a separation between the first host sentence and the second host sentence from a short-range event relation distance to a long-range event relation distance, the long-range event relation distance satisfies the long-range event relation threshold. Further, in one or more embodiments, the series of acts 1100 includes utilizing the generative language model to generate a first synthetic sentence to insert between the first host sentence and the second host sentence from a set of pre-context sentences occurring before the first host sentence and a set of post-context sentences occurring after the second host sentence.

Moreover, in one or more embodiments, the series of acts 1100 includes utilizing the generative language model to generate a second synthetic sentence to insert between the first host sentence and the second host sentence from a modified set of pre-context sentences that includes the first synthetic sentence. Additionally, in one or more embodiments, the series of acts 1100 includes generating the set of synthetic sentences to satisfy a performance-based reward function.

Furthermore, in one or more embodiments, the series of acts 1100 includes determining a number of sentences between the first host sentence and the second host sentence and generating a number of synthetic sentences to insert between the first host sentence and the second host sentence to increase the number of sentences between the first host sentence and the second host sentence to satisfy the long-range event relation threshold. Additionally, in one or more embodiments, the series of acts 1100 includes accessing, from the short-range event relation dataset, a second digital document comprising a second event pair, generating, utilizing the generative language model, a second set of synthetic sentences, and generating the long-range event relation dataset by augmenting the second digital document to include the second set of synthetic sentences.

Moreover, in one or more embodiments, the series of acts 1100 includes generating, utilizing the event relation extraction model, an event relation graph indicating a relationship between a pair of events separated by a number of sentences that satisfies the long-range event relation threshold.

In addition, in one or more embodiments, the series of acts 1100 includes accessing, from the short-range event relation dataset, a digital document comprising an event pair that includes a first event within a first host sentence of the digital document and a second event within a second host sentence within the digital document, generating, utilizing a generative language model, a set of synthetic sentences for uniformly inserting within the digital document across a plurality of insertion locations between the first host sentence and the second host sentence to separate the event pair by a number of sentences that satisfies a long-range event relation threshold, generating a long-range event relation dataset by augmenting the digital document within the short-range event relation dataset to include the set of synthetic sentences between the first host sentence and the second host sentence, modifying the event relation extraction model to determine long-range event relations from digital documents by learning model parameters for the event relation extraction model from the long-range event relation dataset, and generating, utilizing the event relation extraction model, an event relation graph indicating a relationship between a long-range event pair.

Further, in one or more embodiments, the series of acts 1100 determining a number of sentences between the first host sentence and the second host sentence, generating the set of synthetic sentences to insert between the first host sentence and the second host sentence to increase the number of sentences between the first host sentence and the second host sentence to satisfy the long-range event relation threshold, and inserting the set of synthetic sentences between the first host sentence and the second host sentence.

Moreover, in one or more embodiments, the series of acts 1100 includes generating, utilizing the generative language model, a first synthetic sentence to insert between the first host sentence and the second host sentence from a set of pre-context sentences occurring before the first host sentence and a set of post-context sentences occurring after the second host sentence, and generating, utilizing the generative language model, a second synthetic sentence to insert between the first host sentence and the second host sentence from a modified set of pre-context sentences that includes the first synthetic sentence.

Furthermore, in one or more embodiments, the series of acts 1100 includes generating the set of synthetic sentences via successively shifting a set of pre-context sentences by: utilizing the generative language model to generate a first synthetic sentence from a set of pre-context sentences occurring before the first host sentence and a set of post-context sentences occurring after the second host sentence, inserting the first synthetic sentence between the first host sentence and the second host sentence, utilizing the generative language model to generate a second synthetic sentence from a modified set of pre-context sentences different than the set of pre-context sentences, wherein the modified set of pre-context sentences includes the first synthetic sentence, and inserting the second synthetic sentence after the first synthetic sentence and between the first host sentence and the second host sentence.

Additionally, in one or more embodiments, the series of acts 1100 includes generating, as part of the set of synthetic sentences, a first number of synthetic sentences to insert at a first insertion point defined by the first host sentence, wherein the first number of synthetic sentences depends on the long-range event relation threshold, and generating, as a further part of the set of synthetic sentences, a second number of synthetic sentences to insert at a second insertion point defined by the second host sentence.

Moreover, in one or more embodiments, the series of acts 1100 includes generating, as part of the set of synthetic sentences, a first synthetic sentence and a second synthetic sentence based on a performance-based reward function. Further, in one or more embodiments, the series of acts 1100 includes accessing, from the short-range event relation dataset, a second digital document comprising a second event pair and generating, utilizing the generative language model, a second set of synthetic sentences. Moreover, in one or more embodiments, the series of acts 1100 includes generating the long-range event relation dataset by augmenting the second digital document to include the second set of synthetic sentences.

Figure 12:
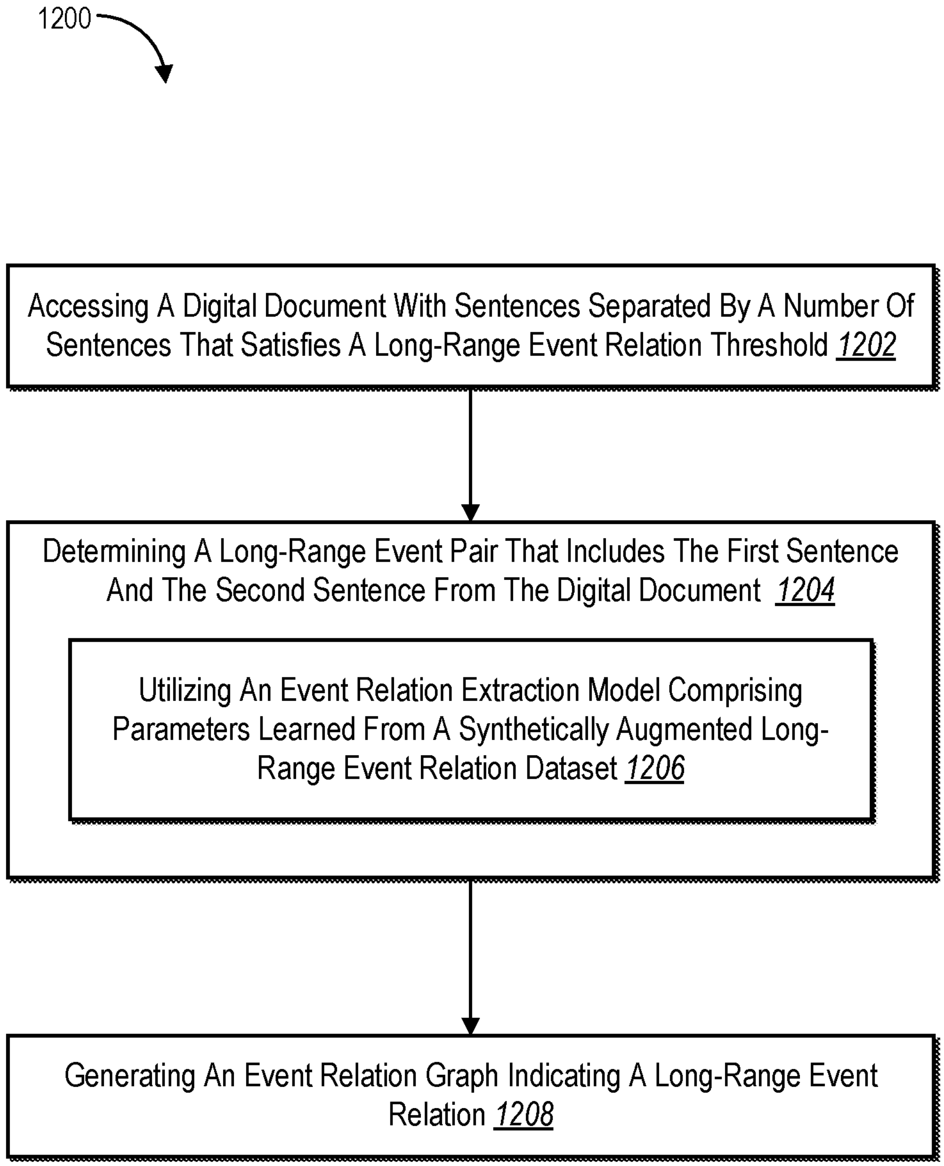
FIG. 12 illustrates a flowchart of a series of acts for generating an event relation graph indicating a long-range event relation in accordance with one or more embodiments.

In addition to the foregoing, one or more embodiments can also be described in terms of flowcharts comprising acts for accomplishing the particular result, as shown in FIG. 12. FIG. 12 may be performed with more or fewer acts. Further, the acts may be performed in different orders. Additionally, the acts described herein may be repeated or performed in parallel with one another or in parallel with different instances of the same or similar acts.

FIG. 12 illustrates a flowchart of a series of acts 1200 for generating an event relation graph in accordance with one or more embodiments. FIG. 12 illustrates acts according to one embodiment, alternative embodiments may omit, add to, reorder, and/or modify any of the acts shown in FIG. 12. In some implementations, the acts of FIG. 12 are performed as part of a method. For example, in some embodiments, the acts of FIG. 12 are performed as part of a computer-implemented method. Alternatively, a non-transitory computer-readable medium can store instructions thereon that, when executed by at least one processor, cause a computing device to perform the acts of FIG. 12. In some embodiments, a system performs the acts of FIG. 12. For example, in one or more embodiments, a system includes at least one memory device. The system further includes at least one server device configured to cause the system to perform the acts of FIG. 12.

The series of acts 1200 includes an act 1202 of accessing a digital document with sentences separated by a number of sentences that satisfies a long-range event relation threshold, an act 1204 of determining a long-range event pair that includes the first sentence and the second sentence from the digital document, a sub-act 1206 of utilizing an event relation extraction model comprising parameters learned from a synthetically augmented long-range event relation dataset, and an act 1208 of generating an event relation graph indicating a long-range event relation.

In particular, the act 1202 includes accessing a digital document comprising a first sentence and a second sentence separated by a number of sentences that satisfies a long-range event relation threshold, the act 1204 includes determining, utilizing an event relation extraction model comprising parameters learned from a synthetically augmented long-range event relation dataset, a long-range event pair that includes the first sentence and the second sentence from the digital document, and the act 1208 includes generating an event relation graph indicating a long-range event relation between the long-range event pair.

Further, the series of acts 1200 in one or more embodiments includes providing the event relation graph to a client device in response to receiving a query pertaining to the digital document from the client device. Additionally, the series of acts 1200 in one or more embodiments includes generating a set of synthetic sentences for inserting within a digital document of a short-range event relation dataset, generating a long-range event relation dataset by augmenting the digital document within the short-range event relation dataset to include the set of synthetic sentences, and updating the model parameters based on the long-range event relation dataset according to a reinforcement learning algorithm.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
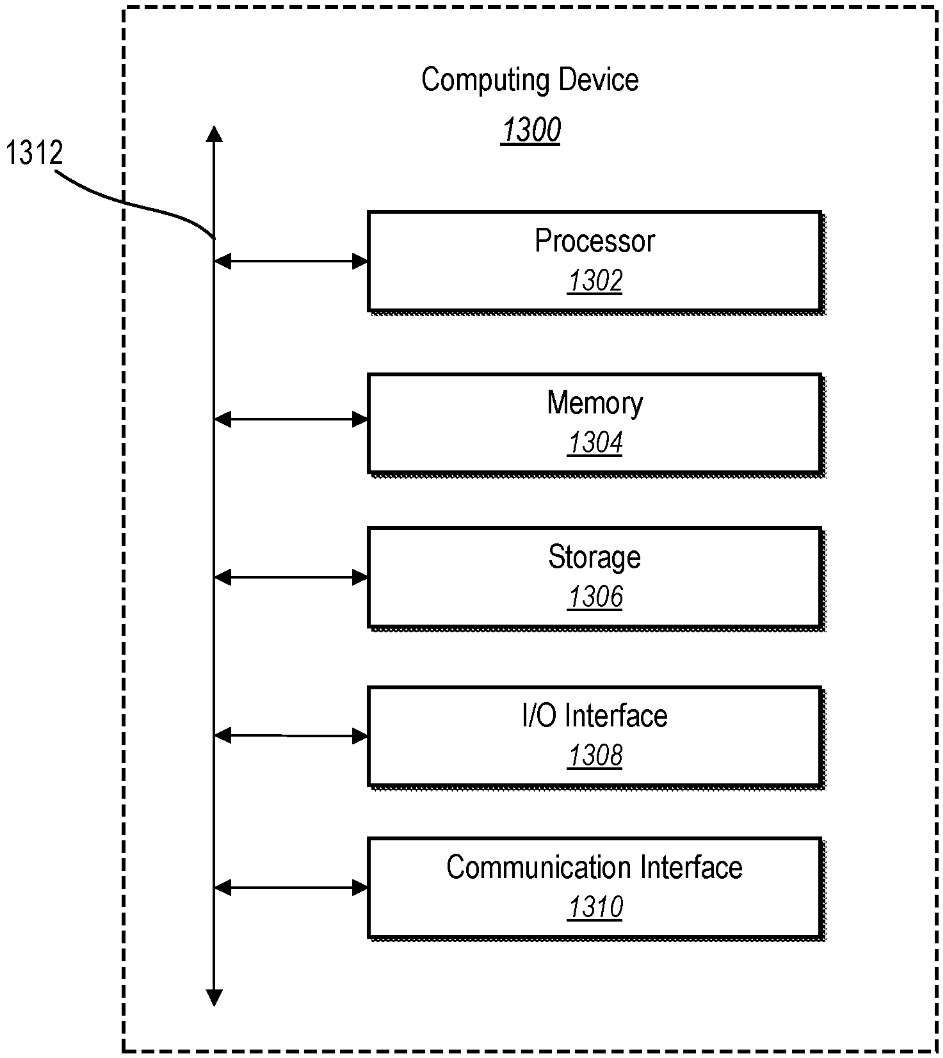
FIG. 13 illustrates a block diagram of an exemplary computing device in accordance with one or more embodiments.

FIG. 13 illustrates a block diagram of an example computing device 1300 that may be configured to perform one or more of the processes described above. One will appreciate that one or more computing devices, such as the computing device 1300 may represent the computing devices described above (e.g., the server(s) 106 and/or the client device 110). In one or more embodiments, the computing device 1300 may be a mobile device (e.g., a mobile telephone, a smartphone, a PDA, a tablet, a laptop, a camera, a tracker, a watch, a wearable device). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 including storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating a long-range event relation dataset that separates event pairs by distances that satisfy a long-range event relation threshold to train an event relation extraction model to determine long-range event relations in a digital document by:

accessing a short-range event relation dataset comprising a digital document comprising an event pair that includes a first event within a first host sentence of the digital document and a second event within a second host sentence within the digital document and the first host sentence and the second host sentence are within a short-range threshold of each other;

determining a current number of sentences separating the first host sentence and the second host sentence;

determining a minimum constraint comprising a number of synthetic sentences to insert based on a difference between the long-range event relation threshold and the current number of sentences;

transforming the short-range event relation dataset to induce long-range event relations within the short-range event relation dataset by generating, utilizing a generative language model, a set of synthetic sentences based on the determined number of synthetic sentences to insert based on the difference between the long-range event relation threshold and the current number of sentences;

inserting within the digital document between the first host sentence and the second host sentence that are initially separated by the short-range threshold to increase a separation between the event pair by the number of synthetic sentences determined based on the difference between the long-range event relation threshold and the current number of sentences;

generating the long-range event relation dataset by augmenting the digital document within the short-range event relation dataset to include the set of synthetic sentences comprising the number of synthetic sentences between the first host sentence and the second host sentence; and generating the event relation extraction model to determine long-range event relations from digital documents by learning model parameters for the event relation extraction model from the long-range event relation dataset.

2. The computer-implemented method of claim 1, wherein generating the event relation extraction model comprises:

encoding long-range event model parameters for the event relation extraction model based on training the event relation extraction model on the long-range event relation dataset; and learning the long-range event relation dataset for the event relation extraction model from events in the long-range event relation dataset that are synthetically induced to be separated by more than twelve sentences.

3. The computer-implemented method of claim 1, wherein generating the set of synthetic sentences comprises:

generating, utilizing the generative language model, a first synthetic sentence to insert between the first host sentence and the second host sentence from a set of pre-context sentences occurring before the first host sentence and a set of post-context sentences occurring after the second host sentence; and generating, utilizing the generative language model, a second synthetic sentence to insert between the first host sentence and the second host sentence from a modified set of pre-context sentences that includes the first synthetic sentence.

4. The computer-implemented method of claim 1, wherein generating the event relation extraction model further comprises:

generating, utilizing a predictor of the event relation extraction model, probabilities of relations between events in the long-range event relation dataset that is constructed from the set of synthetic sentences based on the determined number of synthetic sentences to insert based on the difference between the long-range event relation threshold and the current number of sentences; and selecting, utilizing a selector of the event relation extraction model, a plurality of context sentences from the long-range event relation dataset based on the probabilities of relations between the events in the long-range event relation dataset.

5. The computer-implemented method of claim 4, further comprising:

generating, utilizing the predictor of the event relation extraction model, an event relation in the long-range event relation dataset based on the probabilities of relations between the events and the plurality of context sentences; and comparing the event relation generated by the predictor to the short-range event relation dataset to determine a reward function.

6. The computer-implemented method of claim 5, further comprising modifying learning the model parameters for the selector of the event relation extraction model based on the reward function.

7. The computer-implemented method of claim 5, further comprising:

generating context-based reward and knowledge-based reward from the reward function, wherein the context-based reward encourages selection of sentences with similar contextual semantics to the event pair and the knowledge-based reward encourages retrieving semantic word representations based on the event pair; and modifying the model parameters for the selector of the event relation extraction model based on the context-based reward and the knowledge-based reward.

8. The computer-implemented method of claim 1, wherein generating the long-range event relation dataset comprises:

accessing, from the short-range event relation dataset, a second digital document comprising a second event pair;

determining an additional current number of sentences separating the second event pair in the second digital document of the short-range event relation dataset;

determining an additional minimum constraint comprising an additional number of synthetic sentences to insert based on a difference between the long-range event relation threshold and the additional current number of sentences;

generating, utilizing the generative language model, a second set of synthetic sentences based on the difference between the long-range event relation threshold and the additional current number of sentences; and generating the long-range event relation dataset by augmenting the second digital document to include the second set of synthetic sentences.

9. The computer-implemented method of claim 1, further comprising generating, utilizing the event relation extraction model, an event relation graph indicating a relationship between a pair of events separated by a number of sentences that satisfies the long-range event relation threshold, wherein the event relation graph comprises nodes representing events and edges representing relationships between nodes.

10. A system comprising:

one or more memory devices comprising an event relation extraction model and a short-range event relation dataset; and one or more processors configured to cause the system to:

access the short-range event relation dataset comprising a digital document comprising an event pair that includes a first event within a first host sentence of the digital document and a second event within a second host sentence within the digital document and the first host sentence and the second host sentence are within a short-range threshold of each other;

determine a current number of sentences separating the first host sentence and the second host sentence;

determine a minimum constraint comprising a number of synthetic sentences to insert based on a difference between a long-range event relation threshold and the current number of sentences;

transform the short-range event relation dataset to induce long-range event relations within the short-range event relation dataset by generating, utilizing a generative language model, a set of synthetic sentences based on the determined number of synthetic sentences to insert based on the difference between the long-range event relation threshold and the current number of sentences;

insert the set of synthetic sentences within the digital document across a plurality of insertion locations between the first host sentence and the second host sentence that are initially separated by the short-range threshold to separate the event pair by the number of synthetic sentences determined based on the difference between the long-range event relation threshold and the current number of sentences;

generate a long-range event relation dataset by augmenting the digital document within the short-range event relation dataset to include the set of synthetic sentences comprising the number of synthetic sentences between the first host sentence and the second host sentence;

modify the event relation extraction model to determine long-range event relations from digital documents by learning model parameters for the event relation extraction model from the long-range event relation dataset; and generate, utilizing the event relation extraction model, an event relation graph indicating a relationship between a long-range event pair, wherein the event relation graph comprises nodes representing events and edges representing relationships between nodes.

11. The system of claim 10, wherein the one or more processors are configured to cause the system to generate the event relation extraction model by:

encoding long-range event model parameters for the event relation extraction model based on training the event relation extraction model on the long-range event relation dataset; and learning the long-range event relation dataset for the event relation extraction model from events in the long-range event relation dataset that are synthetically induced to be separated by more than twelve sentences.

12. The system of claim 10, wherein the one or more processors are configured to cause the system to generate the set of synthetic sentences by:

generating, utilizing the generative language model, a first synthetic sentence to insert between the first host sentence and the second host sentence from a set of pre-context sentences occurring before the first host sentence and a set of post-context sentences occurring after the second host sentence; and generating, utilizing the generative language model, a second synthetic sentence to insert between the first host sentence and the second host sentence from a modified set of pre-context sentences that includes the first synthetic sentence.

13. The system of claim 10, wherein the one or more processors are configured to cause the system to generate the set of synthetic sentences via successively shifting a set of pre-context sentences by:

utilizing the generative language model to generate a first synthetic sentence from a set of pre-context sentences occurring before the first host sentence and a set of post-context sentences occurring after the second host sentence;

inserting the first synthetic sentence between the first host sentence and the second host sentence;

utilizing the generative language model to generate a second synthetic sentence from a modified set of pre-context sentences different than the set of pre-context sentences, wherein the modified set of pre-context sentences includes the first synthetic sentence; and inserting the second synthetic sentence after the first synthetic sentence and between the first host sentence and the second host sentence.

14. The system of claim 10, wherein augmenting the digital document to include the set of synthetic sentences further causes the system to:

generate, as part of the set of synthetic sentences, a first number of synthetic sentences to insert at a first insertion point defined by the first host sentence, wherein the first number of synthetic sentences depends on the long-range event relation threshold; and generate, as a further part of the set of synthetic sentences, a second number of synthetic sentences to insert at a second insertion point defined by the second host sentence.

15. The system of claim 10, wherein the one or more processors are configured to cause the system to generate, as part of the set of synthetic sentences, a first synthetic sentence and a second synthetic sentence based on a performance-based reward function.

16. The system of claim 10, wherein the one or more processors are configured to cause the system to:

access, from the short-range event relation dataset, a second digital document comprising a second event pair;

determine an additional current number of sentences separating the second event pair in the second digital document of the short-range event relation dataset;

determine an additional minimum constraint comprising an additional number of synthetic sentences to insert based on a difference between the long-range event relation threshold and the additional current number of sentences; and generate, utilizing the generative language model, a second set of synthetic sentences based on the difference between the long-range event relation threshold and the additional current number of sentences.

17. The system of claim 16, wherein the one or more processors are configured to cause the system to generate the long-range event relation dataset by augmenting the second digital document to include the second set of synthetic sentences.

18. A non-transitory computer-readable medium storing executable instructions which, when executed by a processing device, cause the processing device to perform operations comprising:

accessing a digital document comprising a first sentence and a second sentence separated by a number of sentences that satisfies a long-range event relation threshold;

determining a long-range event pair that includes the first sentence and the second sentence from the digital document, by utilizing an event relation extraction model comprising parameters learned from:

accessing a training short-range event relation dataset;

determining a current number of sentences separating a first host sentence and a second host sentence in the training short-range event relation dataset;

determining a minimum constraint comprising a number of synthetic sentences to insert based on a difference between a long-range event relation threshold and the current number of sentences; and transforming the training short-range event relation dataset to induce long-range event relations by generating, utilizing a generative language model, a set of synthetic sentences based on the determined number of synthetic sentences to insert based on the difference between the long-range event relation threshold and the current number of sentences; and generating an event relation graph indicating a long-range event relation between the long-range event pair, wherein the event relation graph comprises nodes representing events and edges representing relationships between nodes.

19. The non-transitory computer-readable medium of claim 18, wherein the operations further comprise providing the event relation graph to a client device in response to receiving a query pertaining to the digital document from the client device.

20. The non-transitory computer-readable medium of claim 18, further comprising:

generating, utilizing a predictor of the event relation extraction model, probabilities of relations between events in a long-range event relation dataset that is constructed from the set of synthetic sentences based on the determined number of synthetic sentences to insert based on the difference between the long-range event relation threshold and the current number of sentences;

selecting, utilizing a selector of the event relation extraction model, a plurality of context sentences from the long-range event relation dataset based on the probabilities of relations between the events in the long-range event relation dataset;

generating, utilizing the predictor of the event relation extraction model, an event relation in the long-range event relation dataset based on the probabilities of relations between the events and the plurality of context sentences; and comparing the event relation generated by the predictor to the training short-range event relation dataset to determine a reward function.

* * * * *